(12) United States Patent
Hashimoto et al.

(10) Patent No.: US 6,780,917 B2
(45) Date of Patent: Aug. 24, 2004

(54) AROMATIC POLYCARBONATE RESIN COMPOSITION

(75) Inventors: Yoshihide Hashimoto, Tokyo (JP); Tetsuya Aibara, Tokyo (JP); Tomomitsu Onizawa, Tokyo (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 09/794,631

(22) Filed: Feb. 28, 2001

(65) Prior Publication Data

US 2003/0004251 A1 Jan. 2, 2003

(51) Int. Cl.$^7$ .............................. C08J 5/10; C08K 3/34; C08L 69/00
(52) U.S. Cl. ....................... 524/456; 524/442; 524/443; 524/445
(58) Field of Search ................................. 524/442, 443, 524/445, 448, 450, 456

(56) References Cited

U.S. PATENT DOCUMENTS

| | | |
|---|---|---|
| 4,280,949 A | 7/1981 | Dieck |
| 5,965,655 A | 10/1999 | Mordecai et al. |

FOREIGN PATENT DOCUMENTS

| | | |
|---|---|---|
| EP | 0639613 | 2/1995 |
| JP | 5494556 | 7/1979 |
| JP | 55129444 | 10/1980 |
| JP | 5222283 | 8/1993 |
| JP | 649344 | 2/1994 |
| JP | 790118 | 4/1995 |
| JP | 7149948 | 6/1995 |
| JP | 912846 | 1/1997 |
| JP | 1060251 | 3/1998 |
| JP | 10324789 | 12/1998 |
| JP | 2000-256505 | 9/2000 |
| WO | 9851737 | 12/1998 |

Primary Examiner—James J. Seidleck
Assistant Examiner—U. K. Rajguru
(74) Attorney, Agent, or Firm—Wenderoth, Lind & Ponack, L.L.P.

(57) ABSTRACT

An aromatic polycarbonate resin composition comprising:
100 parts by weight of a resin component consisting of (1) 50 to 100 wt % of an aromatic polycarbonate resin (component A) and (2) 0 to 50 wt % of at least one thermoplastic resin (component B) selected from the group consisting of a thermoplastic polyester resin (component B-1) and a styrene unit component-containing resin having a rubber component content of less than 40 wt % (component B-2); and
(3) 1 to 100 parts by weight of wollastonite particles having such particle shape characteristics that the particles have a number average fiber length measured by a method specified in this text of 10 μm or less and a number average fiber diameter measured by a method specified in this text of 4 μm or less and include particles having a fiber length of 5 to 25 μm in a number proportion of less than 50% of the total and moldings thereof. According to the present invention, there are provided an aromatic polycarbonate resin composition which has high stiffness, high impact resistance, a good surface appearance (suppression of the formation of projecting foreign matter which causes deterioration in coating appearance) and recyclability, and moldings thereof.

25 Claims, 1 Drawing Sheet

AROMATIC POLYCARBONATE RESIN COMPOSITION

DETAILED DESCRIPTION OF THE INVENTION

1. Field of the Invention

The present invention relates to an aromatic polycarbonate resin composition. More specifically, it relates to an aromatic polycarbonate resin composition which has high stiffness, high impact resistance, a good surface appearance and excellent recyclability.

2. Prior Art

Aromatic polycarbonate resins and resin compositions obtained by blending thermoplastic polyesters such as a polyethylene terephthalate resin and a polybuthylene terephthalate resin or ABS resin with an aromatic polycarbonate resin are widely used in a variety of fields such as automobiles and OA equipment as a thermoplastic resin which has excellent mechanical properties such as impact strength and a material which retains excellent characteristic properties of aromatic polycarbonate resins and improves chemical resistance and moldability which are defects of aromatic polycarbonate resins, respectively.

As means of improving the stiffness and the like of aromatic polycarbonate resins and resin compositions comprising an aromatic polycarbonate resin as the main ingredient, there are proposed a method of blending a fibrous filler such as glass fiber (JP-A 54-94556, JP-A 6-49344) (the term "JP-A" as used herein means an "unexamined published Japanese patent application") and a method of blending a scaly or platy inorganic filler such as talc or mica (JP-A 55-129444, U.S. Pat. No. 4,280,949, JP-A 5-222283).

An aromatic polycarbonate resin reinforced with a fibrous filler such as glass fiber or carbon fiber and a resin composition comprising this aromatic polycarbonate as the main ingredient have excellent mechanical strength such as stiffness. However, they have such problems that a coating film must be made extremely thick to obtain a good coating appearance because the floating of the fibrous filler such as glass fiber or carbon fiber is observed markedly in the appearances of the molded products obtained by a general molding method and that dimensional stability is not satisfactory that the molded products are readily warped because anisotropy in molding shrinkage and the like is large.

Meanwhile, an aromatic polycarbonate resin obtained by blending a scaly or platy inorganic filler such as talc or mica and a resin composition comprising this aromatic polycarbonate resin as the main ingredient are superior in the appearances of their molded products and dimensional stability to an aromatic polycarbonate resin reinforced with a fibrous filler such as glass fiber or carbon fiber and a resin composition comprising this aromatic polycarbonate resin as the main ingredient. However, their application ranges are limited due to their small reinforcing effect.

Wollastonite particles are an inorganic filler which has excellent properties of the above two. The wollastonite particles have a fibrous form when they are finely ground because of the crystal structure. Therefore, they can provide characteristic properties different from those of the above fibrous and platy fillers to a resin composition.

For example, JP-A 7-90118 discloses a resin composition which comprises wollastonite including trace components ($Fe_2O_3$, $Al_2O_3$) in a specific proportion and a thermoplastic resin. The publication teaches that the wollastonite easily gets a fibrous form and is hardly broken. It further discloses that the obtained resin composition has high strength and elastic modulus and excellent surface smoothness and dimensional accuracy.

JP-A7-149948, EP639613A1 and U.S. Pat. No. 5,965,655 disclose resin compositions which comprise wollastonite needle-like particles having a number average fiber length of 1 to 50 μm and a number average fiber diameter of 0.1 to 10 μm and a thermoplastic resin such as an aromatic polycarbonate resin. They teach that the wollastonite needle-like particles are preferably particles which include particles having a fiber length of 5 to 25 μm in a proportion of at least 50% of the total. They further disclose that the resin compositions disclosed by the above publications satisfy requirements such as a coating appearance with high distinctness of image and a low linear expansion coefficient.

JP-A 9-12846 discloses a resin composition which comprises an aromatic polycarbonate resin, aromatic polyester resin and wollastonite having an aspect ratio of 3 to 50 in a specific ratio. The publication teaches that the resin composition has high stiffness, excellent impact resistance and provides a coated molded product having excellent surface smoothness.

JP-A 10-60251 discloses a resin composition which comprises an aromatic polycarbonate resin having a specific molecular weight, aromatic polyester resin, wollastonite having an aspect ratio of 3 to 50 and carboxyl group modified olefin wax and which has excellent blow moldability. The publication teaches that the resin composition has excellent drawdown properties required for blow molding and high chemical resistance and provides a coated molded product having excellent surface smoothness.

JP-A 10-324789 discloses a resin composition which comprises an aromatic polycarbonate resin having a specific molecular weight, thermoplastic graft copolymer such as ABS resin, wollastonite having an aspect ratio of 3 to 50 and carboxyl group modified olefin wax and which has excellent blow moldability. It teaches that the resin composition has excellent drawdown properties required for blow molding and high impact resistance and provides a coated molded product having excellent surface smoothness.

JP-A 2000-256505 discloses a resin composition which comprises wollastonite including trace components ($Fe_2O_3$, $Al_2O_3$) in a specific proportion and a thermoplastic resin. It teaches that the wollastonite preferably has an average fiber length of 20 to 50 μm, an average fiber diameter of 0.5 to 5 μm and an average aspect ratio of 7 to 100 and that the resin composition gives a molded product having high stiffness and heat resistance, excellent surface smoothness, high tinting properties and a good appearance.

As described above, a resin composition having high rigidity and an excellent surface appearance can be obtained from wollastonite. Wollastonite is particularly preferred as an inorganic filler for a thermoplastic resin mainly composed of an aromatic polycarbonate resin. In the case of a thermoplastic resin mainly composed of an aromatic polycarbonate resin, as the base resin has high impact resistance, a resin composition having high stiffness and high impact resistance can be obtained. Further, in the case of a thermoplastic resin mainly composed of an aromatic polycarbonate resin, the appearance of a molded product of a resin composition containing an inorganic filler is apt to worsen.

However, the above prior art is still unsatisfactory in some points. The first point is that deterioration in the appearance of a coated molded product occurs not a little. The occurrence of a deteriorated appearance affects product yield and production efficiency. The above resin composition containing wollastonite particles is used in a molded product which must have a great coating appearance based on its excellent surface smoothness. However, projecting foreign matter may be slightly formed on the surface of the molded product. The projecting foreign matter becomes extremely conspicuous when the entire surface is flat. Therefore, the suppression of the formation of the projecting foreign matter may be required of the resin composition which comprises an aromatic polycarbonate resin and wollastonite particles.

The second point is the recycling of a molded product. Since the wollastonite particles are a filler which is easily broken, when melt kneading is repeated for recycling, mechanical properties such as stiffness are liable to deteriorate. Deterioration in characteristic properties is marked in the case of a resin composition mainly composed of an aromatic polycarbonate resin having a high melt viscosity. Therefore, a reduction in the change of characteristic properties caused by repeating recycling may be required of the resin composition which comprises an aromatic polycarbonate resin and wollastonite particles.

SUMMARY OF THE INVENTION

It is an object of the present invention to provide an aromatic polycarbonate resin composition which has high stiffness, high impact resistance, a good surface appearance (suppression of the formation of projecting foreign matter which causes a deteriorated coating appearance) and excellent recyclability.

The inventors of the present invention have conducted intensive studies to attain the above object and have surprisingly found that the above object can be attained by an aromatic polycarbonate resin composition which contains relatively fine wollastonite particles which satisfy specific conditions. They have also found that an aromatic polycarbonate resin composition having an ignition loss below a predetermined value is preferred. The present invention has been accomplished based on the above findings.

According to the present invention, there are provided an aromatic polycarbonate resin comprising: 100 parts by weight of a resin component consisting of (1) 50 to 100 wt % of an aromatic polycarbonate resin (component A) and (2) 0 to 50 wt % of at least one thermoplastic resin (component B) selected from the group consisting of a thermoplastic polyester resin (component B-1) and a styrene unit component-containing resin having a rubber component content of less than 40 wt % (component B-2); and (3) 1 to 100 parts by weight of wollastonite particles (component C) having such particle shape characteristics that the particles have a number average fiber length of 10 μm or less and a number average fiber diameter of 4 μm or less and include particles having a fiber length of 5 to 25 μm in a number proportion of less than 50% of the total, and a molded product melt molded therefrom.

The present invention will be described in detail hereinbelow.

The aromatic polycarbonate resin as the component A used in the present invention is obtained by reacting a diphenol with a carbonate precursor. The reaction method is an interfacial polymerization method, molten ester exchange method, carbonate prepolymer solid-phase ester exchange method, or cyclic carbonate compound ring-opening polymerization method.

Typical examples of the diphenol used herein include hydroquinone, resorcinol, 4,4'-dihydroxydiphenyl, bis(4-hydroxyphenyl)methane, bis{(4-hydroxy-3,5-dimethyl) phenyl}methane, 1,1-bis(4-hydroxyphenyl)ethane, 1,1-bis(4-hydroxyphenyl)-1-phenylethane, 2,2-bis(4-hydroxyphenyl)propane (so-called bisphenol A), 2,2-bis{(4-hydroxy-3-methyl)phenyl}propane, 2,2-bis{(4-hydroxy-3,5-dimethyl)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenylsulfone, 4,4'-dihydroxydiphenyl sulfoxide, 4,4'-dihydroxydiphenyl sulfide, 4,4'-dihydroxydiphenylketone, 4,4'-dihydroxydiphenyl ether, 4,4'-dihydroxydiphenyl ester and the like. They may be used alone or in combination of two or more.

Out of these, a homopolymer or copolymer obtained from at least one bisphenol selected from the group consisting of bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α,α'-bis(4-hydroxyphenyl)-m-diisopropylbenzene is preferred, and a homopolymer of bisphenol A and a copolymer of 1,1-bis(4-hydroxyphenyl)-3,3,5-trimethylcyclohexane and bisphenol A, 2,2-bis{(4-hydroxy-3-methyl)phenyl}propane or α,α'-bis(4-hydroxyphenyl)-m-diisopropylbenzene are particularly preferred.

The carbonate precursor is a carbonyl halide, carbonate ester, haloformate or the like, as exemplified by phosgene, diphenyl carbonate and dihaloformates of diphenols.

To produce a polycarbonate resin by reacting the above diphenol and carbonate precursor in accordance with the interfacial polycondensation or molten ester exchange method, a catalyst, terminal capping agent, antioxidant for diphenols and the like may be used as required. The polycarbonate resin may be a branched polycarbonate resin obtained by copolymerizing a polyfunctional aromatic compound having a functionality of 3 or more, polyester carbonate resin obtained by copolymerizing an aromatic or aliphatic dicarboxylic acid, or a mixture of two or more of the obtained polycarbonate resins.

Illustrative examples of the polyfunctional aromatic compound having a functionality of 3 or more include phloroglucin, phloroglucide, triphenols such as 4,6-dimethyl-2,4,6-tris(4-hydroxydiphenyl)heptene-2,2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzylphenol, tetra(4-hydroxyphenyl)methane, bis(2,4-dihydroxyphenyl)ketone, 1,4-bis(4,4-dihydroxytriphenylmethyl)benzene, trimellitic acid, pyromellitic acid, benzophenonetetracarboxylic acid and acid chlorides thereof, and the like. Out of these, 1,1,1-tris (4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

When the polyfunctional compound forming a branched polycarbonate resin is contained, the amount of the polyfunctional compound is 0.001 to 1 mol %, preferably 0.005 to 0.5 mol %, particularly preferably 0.01 to 0.3 mol % based on the total amount of an aromatic polycarbonate. Although a branched structure may be formed as a side reaction in the case of the molten ester exchange method, the amount of the branched structure is 0.001 to 1 mol %, preferably 0.005 to 0.5 mol %, particularly preferably 0.01 to 0.3 mol % based on the total amount of an aromatic polycarbonate. The amount can be measured by $^1$H-NMR.

The reaction carried out by the interfacial polycondensation method is generally a reaction between a diphenol and phosgene in the presence of an acid binder and an organic solvent. Examples of the acid binder include alkali metal hydroxides such as sodium hydroxide and potassium hydroxide and amine compounds such as pyridine. Examples of the organic solvent include hydrocarbon halides such as methylene chloride and chlorobenzene. A catalyst such as a tertiary amine, quaternary ammonium compound or quaternary phosphonium compound exemplified by triethylamine, tetra-n-butylammonium bromide and tetra-n-butylphosphonium bromide may be used to promote the reaction. The reaction temperature is generally 0 to 40° C. the reaction time is about 10 minutes to 5 hours, and pH during the reaction is preferably maintained at 9 or more.

A terminal capping agent is generally used in the above polymerization reaction. A monofunctionalphenol may be used as the terminal capping agent. The monofunctional phenol is generally used as the terminal capping agent to adjust molecular weight and the obtained polycarbonate resin is superior in thermal stability to a polycarbonate resin whose terminal is not capped by a group derived from the monofunctionalphenol. The monofunctional phenol is a phenol or lower alkyl-substituted phenol exemplified by monofunctional phenols represented by the following general formula (1):

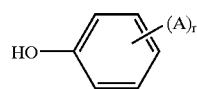

(1)

wherein A is a hydrogen atom, linear or branched alkyl group having 1 to 9 carbon atoms or phenyl group-substituted alkyl group, and r is an integer of 1 to 5, preferably 1 to 3.

Examples of the monofunctional phenol include phenol, p-tert-butylphenol, p-cumylphenol and isooctylphenol.

Other monofunctional phenols include phenols and benzoic acid chlorides having a long-chain alkyl group or aliphatic polyester group as a substituent, and long-chain alkyl carboxylic acid chlorides. Out of these, phenols having a long-chain alkyl group as a substituent represented by the following general formulas (2) and (3) are preferred:

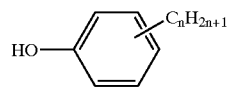

(2)

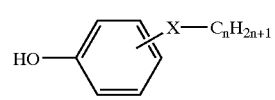

(3)

wherein X is —R—CO—O— or —R—O—CO— (R is a single bond or divalent aliphatic hydrocarbon group having 1 to 10 carbon atoms, preferably 1 to 5 carbon atoms) and n is an integer of 10 to 50.

The substituted phenol of the general formula (2) is preferably a phenol in which n is an integer of preferably 10 to 30, particularly preferably 10 to 26, as exemplified by decyl phenol, dodecyl phenol, tetradecyl phenol, hexadecyl phenol, octadecyl phenol, eicosyl phenol, docosyl phenol and triacontyl phenol.

The substituted phenol of the general formula (3) is preferably a compound in which X is —R—CO—O—, R is a single bond and n is an integer of 10 to 30, particularly 10 to 26, as exemplified by decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate.

The terminal capping agent is introduced in an amount of at least 5 mol %, preferably at least 10 mol %. More preferably, the terminal capping agent is introduced in an amount of 80 mol % or more based on the total of all the terminals of the obtained polycarbonate resin, or the amount of the terminal hydroxyl group (OH group) derived from the diphenol is 20 mol % or less. Particularly preferably, the terminal capping agent is introduced in an amount of 90 mol % or more based on the total of all the terminals, or the amount of the OH group is 10 mol % or less. The terminal capping agents may be used alone or in admixture of two or more.

The reaction carried out by the molten ester exchange method is generally an ester exchange reaction between a diphenol and a carbonate ester which is carried out in the presence of an inert gas by mixing together the diphenol and the carbonate ester under heating and distilling off the formed alcohol or phenol. The reaction temperature, which changes according to the boiling point or the like of the formed alcohol or phenol, is generally 120 to 350° C. In the latter stage of the reaction, the pressure of the reaction system is reduced to $1.33 \times 10^3$ to 13.3 Pa to facilitate the distillation off of the formed alcohol or phenol. The reaction time is generally about 1 to 4 hours.

The carbonate ester is an ester such as an aryl group or aralkyl group having 6 to 10 carbon atoms or alkyl group having 1 to 4 carbon atoms which may be substituted. Examples of the carbonate ester include diphenyl carbonate, bis(chlorophenyl)carbonate, dinaphthyl carbonate, bis(diphenyl)carbonate, dimethyl carbonate, diethyl carbonate, dibutyl carbonate and the like. Out of these, diphenyl carbonate is preferred.

To accelerate the rate of polymerization, a polymerization catalyst may be used. Examples of the polymerization catalyst include alkali metal compounds such as sodium hydroxide, potassium hydroxide, and sodium salts and potassium salts of diphenols, alkali earth metal compounds such as calcium hydroxide, barium hydroxide and magnesium hydroxide, nitrogen-containing basic compounds such as tetramethylammoniumhydroxide, tetraethylammoniumhydroxide, trimethylamine and triethylamine, alkoxides of alkali metals and alkali earth metals, organic acid salts of alkali metals and alkali earth metals, zinc compounds, boron compounds, aluminum compounds, silicon compounds, germanium compounds, organotin compounds, lead compounds, osmium compounds, antimony compounds, manganese compounds, titanium compounds, and zirconium compounds, all of which are generally used for an esterification reaction or ester exchange reaction. These catalysts may be used alone or in combination of two or more. The amount of the polymerization catalyst is preferably $1\times10^{-8}$ to $1\times10^{-3}$ equivalent, more preferably $1\times10^{-7}$ to $5\times10^{-4}$ equivalent based on 1 mol of the diphenol as a raw material.

To reduce the number of phenolic terminal groups in the polymerization reaction, a compound such as bis (chlorophenyl)carbonate, bis(bromophenyl)carbonate, bis (nitrophenyl)carbonate, bis(phenylphenyl)carbonate, chlorophenylphenyl carbonate, bromophenylphenyl carbonate, nitrophenylphenyl carbonate, phenylphenyl carbonate, methoxycarbonylphenylphenyl carbonate or ethoxycarbonylphenylphenyl carbonate is preferably added in the latter stage of a polycondensation reaction or after the end of the polycondensation reaction. Out of these, 2-chlorophenylphenyl carbonate, 2-methoxycarbonylphenylphenyl carbonate and 2-ethoxycarbonylphenylphenyl carbonate are preferred, and 2-methoxycarbonyl- phenylphenyl carbonate is particularly preferred.

In the present invention, a deactivator for neutralizing the activity of a catalyst is preferably used in the polymerization reaction. Illustrative examples of the deactivator include benzenesulfonic acid, p-toluenesulfonic acid, sulfonic acid esters such as methylbenzene sulfonate, ethylbenzene sulfonate, butylbenzene sulfonate, octylbenzene sulfonate, phenylbenzene sulfonate, methyl p-toluene sulfonate, ethyl p-toluene sulfonate, butyl p-toluene sulfonate, octyl p-toluene sulfonate and phenyl p-toluene sulfonate; and compounds such as trifluoromethanesulfonic acid, naphthalenesulfonic acid, sulfonated polystyrene, methyl acrylate-sulfonated styrene copolymer, 2-phenyl-2-propyl-dodecylbenzene sulfonate, 2-phenyl-2-butyl-dodecylbenzene sulfonate, tetrabutylphosphonium octylsulfonate, tetrabutylphosphonium decylsulfonate, tetrabutylphosphonium benzenesulfonate, tetraethylphosphonium dodecylbenzene sulfonate, tetrabutylphosphonium dodecylbenzene sulfonate, tetrahexylphosphonium dodecylbenzene sulfonate, tetraoctylphosphonium dodecylbenzene sulfonate, decylammonium butyl sulfate, decylammonium decyl sulfate, dodecylammonium methyl sulfate, dodecylammonium ethyl sulfate, dodecylmethylammonium methyl sulfate, dodecyldimethylammonium tetradecyl sulfate, tetradecyldimethylammonium methyl sulfate, tetramethylammonium hexyl sulfate, decyltrimethylammonium hexadecyl sulfate, tetrabutylammonium dodecylbenzyl sulfate, tetraethylammonium dodecylbenzyl sulfate and tetramethylammonium dodecylbenzyl sulfate. The deactivator is not limited to these. These compounds may be used in combination of two or more.

Out of the deactivators, phosphonium and ammonium salt deactivators are particularly preferred. The deactivator is used in an amount of preferably 0.5 to 50 mols based on 1 mol of the residual catalyst, or preferably 0.01 to 500 ppm, more preferably 0.01 to 300 ppm, particularly preferably 0.01 to 100 ppm based on the aromatic polycarbonate resin after polymerization.

The molecular weight of the polycarbonate resin is not particularly limited. However, when the molecular weight of the polycarbonate resin is smaller than 10,000, its high-temperature characteristic properties deteriorate and when the molecular weight is larger than 40,000, moldability lowers. Therefore, the viscosity average molecular weight is preferably 10,000 to 40,000, more preferably 14,000 to 30,000, much more preferably 16,000 to 25,000.

Two or more of the aromatic polycarbonate resins may be mixed together. In this case, it is naturally possible to mix an aromatic polycarbonate resin having a viscosity average molecular weight outside the above range.

Since a mixture with an aromatic polycarbonate resin having a viscosity average molecular weight of more than 50,000 exhibits characteristic properties (characteristic properties for dripping prevention, drawdown, and improving melt properties such as improving jetting) derived from its high entropy elasticity, it is preferred when these characteristic properties are required. A mixture with an aromatic polycarbonate resin having a viscosity average molecular weight of 80,000 or more is more preferred and a mixture with an aromatic polycarbonate resin having a viscosity average molecular weight of 100,000 or more is more preferred. In other words, an aromatic polycarbonate resin in which a molecular weight distribution having two or more peaks can be observed by a measurement method such as GPC (Gel Permeation Chromatography) can be preferably used.

The viscosity average molecular weight as used herein is obtained by inserting a specific viscosity ($\eta sp$) obtained from a solution of 0.7 g of a polycarbonate resin dissolved in 100 ml of methylene chloride at 20° C. into the following expression.

$$\eta sp/c=[\eta]+0.45\times[\eta]^2 c ([\eta] \text{ is an intrinsic viscosity})$$

$$[\eta]=1.23\times10^{-4}M^{0.83}$$

$$c=0.7$$

The component B of the present invention preferably contains at least one thermoplastic resin selected from the group consisting of a thermoplastic polyester resin (component B-1) and a styrene unit component-containing resin (component B-2) having a rubber component content of less than 40 wt %.

The reasons for this are as follows. (i) The melt viscosity of the aromatic polycarbonate resin can be reduced and the breakage of wollastonite particles can be further suppressed. As a result, excellent recyclability can be achieved. (ii) The molding temperature and the re-melting temperature at the time of recycling can be reduced for the same reason as (i). Thereby, a reduction in the molecular weight of the aromatic polycarbonate resin caused by a reaction with wollastonite can be suppressed. As a result, excellent recyclability can be achieved. (iii) The above component B-1 and component B-2 do not greatly impair heat resistance and impact resistance expected for the aromatic polycarbonate resin. (iv) The component B-1 and component B-2 give a polymer blend with an aromatic polycarbonate resin having excellent thermal stability and can fully stand a thermal load at the time of recycling.

The thermoplastic polyester resin used as the component B-1 in the present invention is a polymer or a copolymer obtained by conducting a condensation reaction of, as main components, an aromatic dicarboxylic acid or a reactive derivative thereof and a diol or an ester derivative thereof.

Preferred examples of the aromatic dicarboxylic acid include terephthalic acid, isophthalic acid, orthophthalic acid, 1,5-naphthalenedicarboxylic acid, 2,6-naphthalenedicarboxylic acid, 4,4'-biphenyldicarboxylic acid, 4,4'-biphenylether dicarboxylic acid, 4,4'-biphenylmethanedicarboxylic acid, 4,4'-biphenylsulfonedicarboxylic acid, 4,4'- biphenylisopropylidenedicarboxylic acid, 1,2-bis(phenoxy) ethane-4,4'-dicarboxylic acid, 2,5-anthracenedicarboxylic acid, 2,6-anthracenedicarboxylic acid, 4,4'-p-terphenylenedicarboxylic acid, 2,5-pyridinedicarboxylic acid and the like. Out of these, terephthalic acid and 2,6-naphthalenedicarboxylic acid are particularly preferred.

These aromatic dicarboxylic acids may be used in admixture of two or more. The dicarboxylic acid may be mixed with one or more of aliphatic dicarboxylic acids such as adipic acid, azelaic acid, sebacic acid and dodecanedioic acid, and alicyclic dicarboxylic acids such as cyclohexanedicarboxylic acid if small in quantity.

Examples of the diol as a component of the aromatic polyester include aliphatic diols such as ethylene glycol, propylene glycol, butylene glycol, hexylene glycol, neopentyl glycol, pentamethylene glycol, hexamethylene glycol, decamethylene glycol, 2-methyl-1,3-propanediol, diethylene glycol and triethylene glycol; alicyclic diols such as 1,4-cyclohexane dimethanol; diols containing an aromatic ring such as 2,2-bis (P-hydroxyethoxyphenyl)propane; and mixtures thereof. Long-chain diols having a molecular weight of 400 to 6,000 such as polyethylene glycol, poly-1,3-propylene glycol and polytetramethylene glycol may also be used alone or in combination if small in quantity.

The aromatic polyester (component B-1) of the present invention can be branched by introducing a small amount of a branching agent. The branching agent is not limited to a particular type but selected from trimesitinic acid, trimellitic acid, trimethylol ethane, trimethylol propane and pentaerythritol.

Illustrative examples of the aromatic polyester resin include polyethylene terephthalate (PET), polypropylene terephthalate, polybutylene terephthalate (PBT), polyhexylene terephthalate, polyethylene naphthalate (PEN), polybutylene naphthalate (PBN), polyethylene-1,2-bis(phenoxy) ethane-4,4'-dicarboxylate, and copolyester such as polyethylene isophthalate/terephthalate copolymer and polybutylene terephthalate/isophthalate copolymer. Out of these, polyethylene terephthalate, polybutylene terephthalate, polyethylene naphthalate, polybutylene naphthalate and mixtures thereof are preferred because their mechanical properties are well balanced.

The terminal group structure of the obtained aromatic polyester resin is not particularly limited. The amount of the terminal hydroxyl group may be the same, larger or smaller than the amount of the terminal carboxyl group. These terminal groups may be capped by reacting a compound which has reactivity with these terminal groups.

As for the method of producing the aromatic polyester resin, the aromatic polyester resin is produced by polymerizing the above dicarboxylic acid component and diol component under heating in the presence of a polymerization catalyst containing titanium, germanium or antimony and removing the formed water or lower alcohol to the outside of the system in accordance with a commonly used method. The germanium-based polymerization catalyst is, for example, an oxide, hydroxide, halide, alcoholate or phenolate of germanium, as exemplified by germanium oxide, germanium hydroxide, germanium tetrachloride and tetramethoxy germanium.

Preferred examples of the organotitanium compound polymerization catalyst include titanium tetrabutoxide, titanium isopropoxide, titanium oxalate, titanium acetate, titanium benzoate, titanium trimellitate, a reaction product between tetrabutyl titanate and trimellitic anhydride, and the like. The amount of the organotitanium compound is preferably 3 to 12 mg atom % in terms of titanium atoms based on the acid component constituting polybutylene terephthalate.

A conventionally known compounds of manganese, zinc, calcium, magnesium or the like used in the ester exchange reaction before polycondensation may be used in the present invention and polycondensation can be carried out by deactivating the above catalyst with a phosphoric acid or phosphorous acid compound after the end of the ester exchange reaction.

The aromatic polyester resin may be produced by a batch or continuous polymerization process.

The molecular weight of the aromatic polyester resin is not particularly limited but its intrinsic viscosity measured at 35° C. in an o-chlorophenol solvent is 0.6 to 1.5, preferably 0.65 to 1.2, more preferably 0.7 to 1.15.

The styrene unit component-containing resin having a rubber component content of less than 40 wt % used as the component B-2 in the present invention is a styrene unit component-containing resin having a rubber component content of less than 40 wt % obtained by polymerizing a styrene-based monomer and at least one selected from another vinyl monomer and a rubber component copolymerizable with the styrene-based monomer as required.

Examples of the styrene-based monomer used in the above styrene unit component-containing resin component include styrene and styrene derivatives such as α-methylstyrene, o-methylstyrene, p-methylstyrene, vinylxylene, ethylstyrene, dimethylstyrene, p-tert-butylstyrene, vinylnaphthalene, methoxystyrene, monobromostyrene, dibromostyrene, fluorostyrene and tribromostyrene. Out of these, styrene is particularly preferred. Further, they may be used alone or in combination of two or more.

Examples of the another vinyl monomer copolymerizable with the styrene-based monomer include vinyl cyanide compounds such as acrylonitrile and methacrylonitrile, aryl esters of acrylic acid such as phenyl acrylate and benzyl acrylate, alkyl esters of acrylic acid such as methyl acrylate, ethyl acrylate, propyl acrylate, butyl acrylate, amyl acrylate, hexyl acrylate, 2-ethylhexyl acrylate, octyl acrylate, cyclohexyl acrylate and dodecyl acrylate, aryl esters of methacrylic acid such as phenyl methacrylate and benzyl methacrylate, alkyl esters of methacrylic acid such as methyl methacrylate, ethyl methacrylate, propyl methacrylate, butyl methacrylate, amyl methacrylate, hexyl methacrylate, 2-ethylhexyl methacrylate, octyl methacrylate, cyclohexyl methacrylate and dodecyl methacrylate, epoxy group-containing methacrylic esters such as glycidyl methacrylate, maleimide-containing monomers such as maleimide, N-methylmaleimide and N-phenylmaleimide, and α,β-unsaturated carboxylic acids and anhydrides thereof such as acrylic acid, methacrylic acid, maleic acid, maleic anhydride, phthalic acid and itaconic acid.

Examples of the rubber component copolymerizable with the styrene-based monomer include diene-based copolymers such as polybutadiene, polyisoprene, styrene.butadiene random copolymer and block copolymer, acrylonitrile.butadiene copolymer, copolymers of alkyl acrylic esters (or/and alkyl methacrylic esters) and butadiene, and butadiene.isoprene copolymer, copolymers of ethylene and α-olefins such as ethylene.propylene random copolymer and block copolymer, and ethylene.butene random copolymer and block copolymer, copolymers of ethylene and unsaturated carboxylic esters such as ethylene.methacrylate copolymer and ethylene.butyl acrylate copolymer, copolymers of ethylene and aliphatic vinyls such as ethylene.vinyl acetate copolymer, terpolymers of ethylene, propylene and non-conjugated dienes such as ethylene.propylene.hexadiene terpolymer, acrylic rubbers such as polybutylacrylate, and composite rubbers having such a structure that a polyorganosiloxane rubber component and polyalkyl (meth)acrylate rubber component are entangled with each other that they cannot be separated from each other (IPN type rubbers).

Illustrative examples of the styrene unit component-containing resin as the component B-2 include polystyrene, styrene.butadiene.styrene copolymer (SBS resin), hydrogenated styrene.butadiene.styrene copolymer (hydrogenated SBS resin), hydrogenated styrene.isoprene.styrene copolymer (hydrogenated SIS resin), high-impact polystyrene (HIPS resin), acrylonitrile.styrene copolymer (AS resin), acrylonitrile.butadiene.styrene copolymer (ABS resin), methyl methacrylate.butadiene.styrene copolymer (MBS resin), methyl methacrylate.acrylonitrile.butadiene.styrene copolymer (MABS resin), acrylonitrile.styrene.acrylic rubber copolymer (ASA resin), acrylonitrile.ethylene propylene-based rubber.styrene copolymer (AES resin), styrene.methyl methacrylate copolymer (MS resin), methyl methacrylate.acrylonitrile.styrene copolymer (MAS resin), styrene.maleic anhydride copolymer (SMA resin), styrene.IPN type rubber copolymer and mixtures thereof. The above styrene-based thermoplastic resins may have high stereoregularity like syndiotactic polystyrene due to use of a catalyst such as a metallocene catalyst for production. Further, a polymer and copolymer having a narrow molecular weight distribution obtained by anion living polymerization or radical living polymerization, block copolymer, and polymer and copolymer having high stereoregularity may also be used according to circumstances. They may be used alone or in admixture of two or more.

Out of these, one or a mixture of two or more selected from the group consisting of polystyrene (PS resin), high-impact polystyrene (HIPS resin), acrylonitrile.styrene copolymer (AS resin), acrylonitrile.butadiene.styrene copolymer (ABS resin), acrylonitrile.styrene.acrylic rubber copolymer (ASA resin), acrylonitrile.ethylene propylene-based rubber.styrene copolymer (AES resin) and methyl methacrylate.butadiene.styrene copolymer (MBS resin) is preferred. ABS resin, ASA resin and AES resin are the most preferred.

ABS resin used in the present invention is a mixture of a thermoplastic graft copolymer obtained by graft polymerizing a vinyl cyanide compound and an aromatic vinyl compound with a diene-based rubber component and a copolymer of a vinyl cyanide compound and an aromatic vinyl compound. The diene-based rubber component forming this ABS resin is a rubber having a glass transition point of 10° C. or less such as polybutadiene, polyisoprene or styrene.butadiene copolymer and used in an amount of preferably 5 to 39.9 wt %, more preferably 10 to 35 wt %, much more preferably 10 to 25 wt % based on 100 wt % of the ABS resin component.

Examples of the vinyl cyanide compound to be graft polymerized with the diene-based rubber component are those enumerated above, out of which acrylonitrile is particularly preferred. Examples of the aromatic vinyl compound to be graft polymerized with the diene-based rubber component are those enumerated above, out of which styrene and α-methylstyrene are particularly preferred. The amount of the component to be graft polymerized with the diene-based rubber component is preferably 60.1 to 95 wt %, more preferably 65 to 90 wt %, much more preferably 75 to 90 wt % based on 100 wt % of the ABS resin component. Further, the amount of the vinyl cyanide compound is 5 to 50 wt %, more preferably 10 to 30 wt % and the amount of the aromatic vinyl compound is preferably 95 to 50 wt %, more preferably 90 to 70 wt % based on 100 wt % of the total of the vinyl cyanide compound and the aromatic vinyl compound. Methyl (meth)acrylate, ethyl acrylate, maleic anhydride or N-substituted maleimide may be used as part of the component to be graft polymerized with the diene-based rubber component. The amount of the above substance is preferably 15 wt % or less based on the ABS resin component. Conventionally known initiators, chain transfer agents, emulsifiers and the like used for a reaction may be further used as required.

The particle diameter of the rubber particles contained in the ABS resin of the present invention is preferably 0.1 to 5.0 μm, more preferably 0.3 to 3.0 μm, furthermore preferably 0.4 to 1.5 μm, particularly preferably 0.4 to 0.9 μm. A rubber having a particle size distribution with a single peak or two or more peaks may be used and a rubber having such morphology that rubber particles form a single phase or that a salami structure is formed by containing an occluded phase around each rubber particle may be used as the rubber particles.

It has been well known that ABS resin contains a vinyl cyanide compound and an aromatic vinyl compound which are not graft polymerized with a diene-based rubber component, and the ABS resin of the present invention may contain a free polymer component formed by polymerization. The molecular weight of a copolymer of a free vinyl cyanide compound and a free aromatic vinyl compound is preferably 0.2 to 1.0, more preferably 0.25 to 0.5 in terms of reduced viscosity.

The weight proportion (graft ratio) of the grafted vinyl cyanide compound and aromatic vinyl compound to the diene-based rubber component is preferably 20 to 200 wt %, more preferably 20 to 70 wt %.

This ABS resin may be produced by bulk polymerization, suspension polymerization or emulsion polymerization, or by single-stage or multi-stage copolymerization. What is obtained by blending a vinyl compound polymer obtained by copolymerizing an aromatic vinyl compound and vinyl cyanide component with the ABS resin may also be preferably used. Further, soap-free polymerization using an initiator such as potassium persulfate, seed polymerization, two-stage swelling polymerization and the like may be employed in addition to general emulsion polymerization. A water phase and a monomer phase may be kept separately and supplied to a continuous dispersion machine accurately to control the particle size by the revolution speed of the dispersion machine in the suspension polymerization, or a monomer phase may be supplied to an aqueous liquid having dispersibility through an orifice or porous filter having a pore size of several to several tens of microns to control the particle size in the continuous production method.

The ASA resin used in the present invention is a thermoplastic graft copolymer obtained by graft polymerizing a vinyl cyanide compound and an aromatic vinyl compound with an acrylic rubber component, or a mixture of the thermoplastic graft copolymer and a copolymer of a vinyl cyanide compound and an aromatic vinyl compound. The expression "acrylic rubber" as used herein means acrylic rubber which contains an alkyl acrylate unit having 2 to 10 carbon atoms and may contain styrene, methyl methacrylate or butadiene as another copolymerizable component as required. The alkyl acrylate having 2 to 10 carbon atoms is preferably 2-ethylhexyl acrylate or n-butyl acrylate and preferably contained in an amount of 50 wt % or more based on 100 wt % of the acrylic rubber. The acrylic rubber is at least partially crosslinked. Examples of the crosslinking agent include ethylene glycol diacrylate, butylene glycol diacrylate, ethylene glycol dimethacrylate, allyl methacrylate, polypropylene glycol diacrylate and the like. The crosslinking agent is preferably used in an amount of 0.01 to 3 wt % based on the acrylic rubber. The amount of the acrylic rubber component is preferably 5 to 39.9 wt %, more preferably 10 to 35 wt %, much more preferably 10 to 25 wt % based on 100 wt % of ASA resin.

As for the weight ratio of the vinyl cyanide compound to the aromatic vinyl compound, preferably the amount of the vinyl cyanide compound is 5 to 50 wt % and the amount of the aromatic vinyl compound is 95 to 50 wt %, and particularly preferably the amount of the vinyl cyanide compound is 15 to 35 wt % and the amount of the aromatic vinyl compound is 85 to 65 wt % based on 100 wt % of the total of the vinyl cyanide compound and the aromatic vinyl compound. The same production method as ABS resin may be employed to produce the ASA resin.

AES resin used in the present invention is a thermoplastic graft copolymer obtained by graft polymerizing a vinyl cyanide compound and an aromatic vinyl compound with an ethylene-propylene rubber component or ethylene-propylene-diene rubber component, or a mixture of the thermoplastic graft copolymer and a copolymer of a vinyl cyanide compound and an aromatic vinyl compound. The same production method as ABS resin may be employed to produce the AES resin.

A thermoplastic resin consisting of the components A and B has a melt viscosity measured at 260° C. with a capillary rheometer of preferably $0.1 \times 10^3$ to $5 \times 10^3$ Pa·s, more preferably $0.3 \times 10^3$ to $2 \times 10^3$ Pa·s at a shear rate of $300\ \text{sec}^{-1}$. The aromatic polycarbonate resin composition of the present invention can achieve a good surface appearance and excellent recyclability by using specific wollastonite particles even when the above resin is used.

The wollastonite particles as the component C of the present invention have such particle shape characteristics that the particles have a number average fiber length obtained by the following measuring method of 10 μm or less and a number average fiber diameter obtained by the following measuring method of 4 μm or less and include particles having a fiber length of 5 to 25 μm in a number proportion of less than 50% of the total.

The measuring methods of the above fiber length and fiber diameter are as follows. The measurement of fiber length is carried out by observing wollastonite particles as a raw material through an optical microscope to obtain the length of each wollastonite particle and calculating a number average fiber length and the number proportion of particles having a fiber length of 5 to 25 μm from the measurement values. Most of the wollastonite particles retain a fibrous form even when they are finely ground due to characteristic properties derived from their crystal structure.

For observation through the optical microscope, a sample in which wollastonite particles are uniformly dispersed such that they do not overlap with one another is first prepared. The sample is observed with an objective lens having a power of 20× and the observed image is input into a CCD camera with about 250,000 pixels as image data. The obtained image data is analyzed by an image analyzer to calculate fiber length using a program for obtaining the maximum distance between two points of the image data. The size of one pixel is equivalent to a length of 1.25 μm under the above conditions. The number of samples is 5,000 or more.

Meanwhile, the measurement of fiber diameter is carried out by observing wollastonite particles as a raw material of the composition through an electron microscope to obtain the fiber diameter of each wollastonite particle and calculating a number average fiber diameter from the measurement values. The reason why the electron microscope is used is that it is difficult to measure accurately the size of level to deal with using the optical microscope.

As for fiber diameter, wollastonite particles whose fiber diameters are to be measured are selected at random from the image obtained by observation through the electron microscope to measure the fiber diameters at a site close to the center portion. A number average fiber diameter is calculated from the obtained measurement values. Since a recent electron microscope has the function of calculating the length from its observation image, the fiber diameter can be calculated relatively easily. The magnification of observation is about 1,000× and the number of samples is 1,000 or more.

Any mill maybe used to mill wollastonite as the component C such that conditions for the above particle shape characteristics are satisfied, as exemplified by a high-speed rotary mill, ball mill, medium stirring mill and jet mill. Out of these, a jet mill is preferred. Further, the jet mill system may be an airstream suction, in-nozzle airstream suction, collision against impact member, counter jet collision or composite type system. Out of these, a counter jet collision system mill is preferred.

It is preferred to obtain wollastonite particles of interest by classifying the milled wollastonite particles to remove a component having a large fiber length. The above classification is carried out by putting the wollastonite particles through a net sieve or by using an impactor type inertia classifier (such as a Variable Impactor), wtilizing Coanda effect type inertia classifier (such as an Elbow Jet), spiral airstream type centrifugal classifier (such as a multi-stage cyclone), free vortex helical airstream type centrifugal classifier equipped with a guide blade (such as Mikroplex or dispersion separator), forced vortex helical airstream type centrifugal classifier equipped with a rotary classifying chamber (such as Acucut or Turbo Classifier), or forced vortex helical airstream type centrifugal classifier equipped with a rotary blade (such as Micron Separator or Super Separator). Composite classifiers thereof are also preferably used (names in parentheses are trade names or familiar names). Out of these, centrifugal classifiers are preferred because they can classify fine particles.

The wollastonite particles can be obtained by milling and classifying a natural white mineral having needle-like crystals and essentially composed of calcium silicate. Synthesized wollastonite may also be used in the present invention. It is known that these wollastonites are substantially represented by a chemical formula $CaO \cdot SiO_2$, contain about 50 wt % of $SiO_2$ and about 47 wt % of CaO and impurities such as $Fe_2O_3$, $Al_2O_3$ and $CaCO_3$ and has a specific gravity of about 2.9.

By using wollastonite particles having the above specific shape, there is provided a molded product of an aromatic polycarbonate resin composition having a good surface appearance with the suppression of the formation of projecting foreign matter which causes the deterioration of a coating appearance and excellent recyclability.

The above number average fiber length is preferably 3 to 10 μm, more preferably 3.5 to 8 μm, much more preferably 4 to 8 μm. The above number average fiber diameter is preferably 0.5 to 4 μm, more preferably 0.5 to 2.5 μm, much more preferably 1 to 2 μm. When the number average fiber length is 3 μm or more, it is advantageous in terms of stiffness and strength. Although the surface smoothness improves as the number average fiber diameter decreases, when the number average fiber diameter is 0.5 μm or more, the fibrous particles are hardly broken, which is advantageous in improving recyclability.

The number proportion of particles having a fiber length of 5 to 25 μm is preferably 30% or more and less than 50%, more preferably 35% or more and less than 49%, much more preferably 40% or more and less than 48% of the total. When the number proportion of particles having a fiber length of 5 to 25 μm is 30% or more of the total, it is advantageous in terms of stiffness and strength.

According to a preferred aspect of the present invention, the wollastonite particles include particles having a fiber length based on the above measurement of more than 25 μm in a number proportion of 5% or less because wollastonite particles having a fiber length of more than 25 μm readily cause the formation of projecting foreign matter and long particles are easily broken at the time of melt kneading. The number proportion of particles having a fiber length of more than 25 μm is preferably 4% or less, more preferably 3.5% or less of the total. The lower limit is 0.5%.

According to a more preferred aspect of the present invention, the wollastonite particles include particles passing through a 325-mesh sieve (based on ASTM standards) calculated by the following wet screening method in a proportion of 99.95 wt % or more, preferably 99.96 wt % or more. By satisfying the above condition, the formation of projecting foreign matter can be further suppressed, whereby deterioration in a coating appearance can be reduced. The proportion of the particles passing through a 325-mesh sieve is preferably 99.97 wt % or more. To obtain wollastonite particles which satisfies the above condition, the above net sieve or centrifugal classifier is preferably used to classify the wollastonite particles after milling.

A description is subsequently given of the calculation of the amount of particles passing through a 325-mesh sieve by the above wet screening method. About 20 g of wollastonite particles are weighed by an electronic balance (the weight is $\alpha$ g). The wollastonite particles are placed on a 325-mesh sieve (based on ASTM standards), water is poured onto the sieve for 3 minutes, and then the wollastonite particles on the sieve are dried with a heating lamp for 5 minutes. The sample remaining on the sieve is removed with a brush carefully and weighed by the electronic balance (the weight is $\beta$ g). The proportion of the wollastonite particles passing through the 325-mesh sieve is calculated from the values $\alpha$ (g) and $\beta$ (g) based on the equation $((\alpha-\beta)\times100/\alpha)$ (wt %).

According to a much more preferred aspect of the present invention, the wollastonite particles have an ignition loss described below of 1.7 wt % or less. The ignition loss is preferably 1.5 wt % or less, more preferably 1.2 wt % or less.

The inventors of the present invention have found that wollastonite particles having an ignition loss of 1.7 wt % or less have an excellent reinforcing effect and rarely experience a reduction in stiffness and strength when they are melt kneaded with a resin mainly composed of an aromatic polycarbonate resin and having a high melt viscosity repeatedly, that is, they are excellent in recyclability.

As for the ignition loss of the wollastonite particles in the present invention, wollastonite particles or fibers which have been heated at 110° C. for 6 hours to remove water contained therein and left in a dessicator (containing a desiccant) to be cooled to room temperature are prepared. The wollastonite particles or fibers are continuously heated up to 1,300° C. at a rate of 10° C./min by a TGA (Thermogravimetric Analysis) measuring instrument and a weight reduction thereof is calculated when the temperature reaches 1,300° C. and taken as ignition loss.

It is considered that the weight reduction caused by this ignition treatment is mainly $CO_2$ derived from $CaCO_3$ which is contained as an impurity in the wollastonite particles in a small amount. That is, it is assumed that wollastonite particles containing a smaller amount of $CaCO_3$ as an impurity is more excellent in reinforcing effect and recyclability.

The wollastonite particles may be surface treated with a general surface treating agent such as a coupling agent exemplified by silane-based coupling agents and titanate-based coupling agents. Out of the silane-based coupling agents, an epoxy silane coupling agent is preferred. A mixture of polyalkoxysiloxane and an epoxy silane coupling agent and/or a reaction product of polyalkoxysiloxane and an epoxy silane coupling agent are/is also preferred. Wollastonite particles surface treated with any one of the silane coupling agents may be used.

The ratio of the above components A, B and C is as follows. The amount of the component A is 50 to 100 wt %, preferably 50 to 95 wt %, more preferably 60 to 90 wt % based on 100 wt % of the total of the components A and B as the resin component. The amount of the component B is 0 to 50 wt %, preferably 5 to 50 wt %, more preferably 10 to 40 wt %. When the amount of the component A is smaller than 50 wt % based on 100 wt % of the total of the components A and B, heat resistance and impact strength lower disadvantageously.

The amount of the component C is 1 to 100 parts by weight, preferably 1 to 70 parts by weight, more preferably 1 to 50 parts by weight, much more preferably 1 to 30 parts by weight based on 100 parts by weight of the above resin component. When the amount of the wollastonite particles as the component C is smaller than 1 part by weight, mechanical properties such as stiffness lower and when the amount is larger than 100 parts by weight, impact strength and appearance deteriorate disadvantageously.

An elastic polymer may be used as component D to further improve the impact strength and the like of the aromatic polycarbonate resin composition obtained in the present invention. The elastic polymer as the component D usable in the present invention is, for example, a graft copolymer obtained by copolymerizing at least one monomer selected from the group consisting of aromatic vinyls, vinyl cyanides, acrylic esters, methacrylic esters and vinyl compounds copolymerizable therewith with a rubber component having a glass transition temperature of 10° C. or less.

Block copolymers of the above rubber component and the monomers may also be used. The block copolymers are thermoplastic elastomers such as styrene.ethylene propylene.styrene elastomer (hydrogenated styrene.isoprene.styrene elastomer) and hydrogenated styrene.butadiene.styrene elastomer.

Elastic polymers which are known as other thermoplastic elastomers, such as polyurethane elastomer, polyester elastomer and polyether amide elastomer, may also be used. The elastic polymers contain a rubber component in an amount of 40% or more and are clearly distinguished from ABS resin and so on as the component B of the present invention in this point.

Examples of the rubber component having a glass transition temperature of 10° C. or less include butadiene rubber, butadiene-acryl composite rubber, acrylic rubber, acryl-silicon composite rubber, isobutylene-silicon composite rubber, isoprene rubber, styrene-butadiene rubber, chloroprene rubber, ethylene-propylene rubber, nitrile rubber, ethylene-acryl rubber, silicon rubber, epichlorohydrin rubber, fluorine rubber and what contain hydrogen added to the unsaturated bond thereof.

Out of these, elastic polymers containing a rubber component having a glass transition temperature of −10° C. or less, preferably −30° C. or less are preferred and elastic polymers containing butadiene rubber, butadiene-acryl composite rubber, acrylic rubber or acryl-silicon composite rubber are particularly preferred. The expression "composite rubber" means rubber obtained by copolymerizing two different rubber components or rubber having an IPN structure that two different rubber components are entangled with each other that they cannot be separated from each other.

The aromatic vinyls include styrene, α-methylstyrene, p-methylstyrene, alkoxystyrene, styrene halide and the like. Styrene is particularly preferred. The acrylic esters include methyl acrylate, ethyl acrylate, butyl acrylate, cyclohexyl acrylate, octyl acrylate and the like. The methacrylic esters include methyl methacrylate, ethyl methacrylate, butyl methacrylate, cyclohexyl methacrylate, octyl methacrylate and the like. Methyl methacrylate is particularly preferred.

The elastic polymer containing a rubber component having a glass transition temperature of 10° C. or less may be produced by bulk polymerization, solution polymerization, suspension polymerization or emulsion polymerization, or by single-stage or multi-stage graft copolymerization. A mixture of an elastic polymer and a copolymer of only graft components by-produced may also be used. Further, soap-free polymerization using an initiator such as potassium persulfate, seed polymerization, two-stage swelling polymerization and the like may be employed in addition to general emulsion polymerization. A water phase and a monomer phase may be kept separately and supplied to a continuous dispersion machine accurately to control the particle size by the revolution speed of the dispersion machine in the suspension polymerization, or a monomer phase may be supplied into an aqueous liquid having dispersibility through an orifice or porous filter having a pore size of several to several tens of microns to control the particle size in the continuous production method.

The elastic polymer is available on the market and can be easily acquired. Commercially available products of the elastic polymer which comprises butadiene rubber, acrylic rubber or butadiene-acryl composite rubber as the rubber component having a glass transition temperature of 10° C. or less include Kaneace B series of Kaneka Corporation, Metablen C series of Mitsubishi Rayon Co., Ltd., EXL series, HIA series, BTA series and KCA series of Kureha Chemical Industry Co., Ltd. and UCL Modifier Resin Series of Ube Cycon, Ltd. Commercially available products of the elastic polymer which comprises acryl-silicon composite rubber as the rubber component having a glass transition temperature of 10° C. or less include Metablen S-2001 and SRK-200 of Mitsubishi Rayon Co., Ltd.

The amount of the component D is preferably 0.5 to 50 parts by weight, more preferably 0.5 to 30 parts by weight, much more preferably 1 to 20 parts by weight based on 100 parts by weight of the total of the component A and optionally the component B. When the amount of the elastic polymer as the component D is larger than 50 parts by weight, heat resistance and appearance deteriorate disadvantageously.

The resin composition of the present invention may contain a breakage suppression agent (component E) for suppressing the breakage of the wollastonite particle. It is preferred that the resin composition should contain the agent because a more favorable effect is obtained particularly when the agent is used in combination with the wollastonite particles of the present invention.

The agent for suppressing the breakage of the wollastonite particle is an agent which comprises a component having slipperiness for the aromatic polycarbonate resin as the component A and a functional group having reactivity with or affinity for the wollastonite particle for enabling the agent to cover the surface of the wollastonite particle. Thank to this structure, the agent is not bonded or adhered to the resin component but to the wollastonite particle while the constituent components of the resin composition of the present invention are molten and mixed with the result that the surface of the wollastonite particle is covered with the lubricant.

Examples of the component which has slipperiness for the aromatic polycarbonate resin include higher fatty acid esters, higher fatty acid amides, polyolefin components, polyorganosiloxane components, fluorine-substituted polyolefin components, alkyl ether components, fluorine-substituted polyalkyl ether components and the like, out of which polyolefin wax, silicone oil and fluorine oil components are preferred.

Examples of the functional group having reactivity with and affinity for the wollastonite particle include carboxyl group, ester group, amide aroup, amino group, epoxy group, thioester group, cycliciminoether groups such as 2-oxazoline, and carboxylic anhydride groups such as succinic anhydride-2-yl and succinic anhydride-2,3-diyl. Out of these, carboxyl group, epoxy group and carboxylic anhydride groups are preferred, and what contain maleic anhydride are particularly preferred because they do not have a decomposition function for the aromatic polycarbonate resin.

The method of bonding a lubricant to a functional group is (1) a method in which the lubricant is reacted with a compound having the above functional group and a functional group having reactivity with the lubricant, (2) a method in which a compound having the above functional group is copolymerized at the time of synthesizing the lubricant, (3) a method in which the lubricant, a compound having the above functional group and a radical forming agent are mixed together under heating and reacted with one another, or (4) a method in which modification is carried out thermal oxidation.

A preferred example of the component E is an olefin-based wax containing a carboxyl group and/or carboxylic anhydride group. The olefin-based wax containing a carboxyl group and/or carboxylic anhydride group is a compound which contains a carboxyl group and/or carboxylic anhydride group by post-treating an olefin-based wax, preferably a compound modified by post-treating an olefin-based wax with maleic acid and/or maleic anhydride. Further, a such copolymerized compound that in polymerizing or copolymerizing of ethylene and/or 1-alkene the monomer is copolymerized with a compound containing a carboxyl group and/or carboxylic anhydride group copolymerizable with the monomer, preferably maleic acid and/or maleic anhydride may also be used. The copolymerized compound is preferred because the carboxyl group and/or carboxylic anhydride group are/is contained in high concentration and stably.

The carboxyl group and carboxylic anhydride group may be bonded to any part of the olefin-based wax and their concentrations are not particularly limited. However, the concentration of each of these groups is preferably 0.1 to 6 meq/g, more preferably 0.5 to 4 meq/g based on 1 g of the olefin-based wax because the breakage of the wollastonite particle can be suppressed efficiently. "1 eq (1 equivalent)" means 1 mol of the carboxyl group or 0.5 mol of the carboxylic anhydride group. It is preferred that another functional group should be contained in the same amount as the carboxyl group.

The weight average molecular weight of the olefin wax containing a carboxyl group and/or carboxylic anhydride group is 1,000 to 20,000, preferably 3,000 to 15,000. The molecular weight is a value in term of polystyrene obtained using a calibration line obtained from standard polystyrene.

The preferred component E in the present invention is a copolymer of an α-olefin and maleic anhydride. The copolymer can be produced by melt polymerization or bulk polymerization in the presence of a radical catalyst in accordance with a commonly used method. The α-olefin preferably has 10 to 60 carbon atoms on the average. The average number of carbon atoms of the α-olefin is more preferably 16 to 60, much more preferably 25 to 55.

Commercially available products of the olefin-based wax include Diacarner PA30 (trade name of Mitsubishi Chemical Corporation), Hi-wax acid treated type 2203A and 1105A (trade name of Mitsui Petrochemical Industries, Ltd.) and the like. Diacarner PA30 and PA30M are particularly preferred. They are used alone or in admixture of two or more.

Another example of the component E is a polyorganosiloxane containing at least one functional group selected from the group consisting of carboxyl group, carboxylic anhydride group and epoxy group. It can be obtained from a reaction between a silane-based coupling agent having the above group and an alkoxy group-containing polyorganosiloxane. The component E is preferably selected from polyalkyl hydrogen silicones as silicone oil. Out of these, polymethyl hydrogen silicone oil is particularly preferred because it is easily acquired.

The same effect can be obtained by surface treating the wollastonite particle with a lubricant. In this case, a lubricant having no functional group reactive with the wollastonite particle may also be used. The above compounds may be used as the lubricant. The wollastonite particle surface treated with a lubricant may be obtained by mixing the lubricant in a solution state or an aqueous dispersion state with the wollastonite particle by a mixer or the like and drying. Therefore, the agent (component E) for suppressing the breakage of the wollastonite particle of the present invention is selected from (i) a lubricant having a functional group reactive with the wollastonite particle and (ii) a lubricant coating the surface of the wollastonite particle in advance.

When the component E is used, it is added in an amount of 0.02 to 5 parts by weight based on 100 parts by weight of the resin composition which comprises the component A and optionally the component B to suppress the breakage of the wollastonite particle and obtain excellent recyclability. When the amount of the component E is larger than 5 parts by weight, delamination occurs disadvantageously.

The aromatic polycarbonate resin composition of the present invention may contain another thermoplastic resin (component F) in addition to the above components A and B. Examples of the another thermoplastic resin include polyamide resins, acrylic resins and polyolefin resins such as polyethylene resin and polypropylene resin. Further, engineering plastics such as polyphenyl ether and polyacetal, and super engineering plastics such as polyether ether ketones, polyether imides, polyether amides, polysulfones, polyether sulfones and polyphenylene sulfides may also be used.

The component F is contained in an amount of preferably 0.5 to 20 parts by weight, more preferably 1 to 15 parts by weight based on 100 parts by weight of the resin component which consists of the component A and optionally the component B.

The aromatic polycarbonate resin composition of the present invention comprises the above components A and C and optionally the components B, D and E. It can further contain additives such as a flame retardant in limits not prejudicial to the object of the present invention.

The flame retardant (component G) which can be used in the aromatic polycarbonate resin composition of the present invention is not particularly limited. Examples of the flame retardant include halogenated bisphenol A polycarbonate flame retardants, organic salt-based flame retardants, aromatic phosphoric ester-based flame retardants halogenated aromatic phosphoric ester-based flame retardant and the like. They may be used alone or in combination.

Specifically, the halogenated bisphenol A polycarbonate flame retardants include tetrachlorobisphenol A polycarbonate flame retardant, tetrachlorobisphenol A-bisphenol A copolycarbonate flame retardant, tetrabromobisphenol A polycarbonate flame retardant, tetrabromobisphenol A-bisphenol A copolycarbonate flame retardant and the like.

The organic salt-based flame retardants include dipotassium diphenylsulfone-3,3'-disulfonate, potassium diphenylsulfone-3-sulfonate, sodium 2,4,5-trichlorobenzene sulfonate, potassium 2,4,5-trichlorobenzene sulfonate, potassium bis(2,6-dibromo-4-cumylphenyl)phosphate, sodium bis(4-cumylphenyl)phosphate, potassium bis(p-toluenesulfone)imide, potassium bis(diphenylphosphate) imide, potassium bis(2,4,6-tribromophenyl)phosphate, potassium bis(2,4-dibromophenyl)phosphate, potassium bis(4-bromophenyl)phosphate, potassium diphenyl phosphate, sodium diphenyl phosphate, potassium perfluorobutane sulfonate, sodium lauryl sulfate, potassium lauryl sulfate, sodium hexadecyl sulfate, potassium hexadecyl sulfate and the like.

The halogenated aromatic phosphoric ester-based flame retardants include tris(2,4,6-tribromophenyl)phosphate, tris(2,4-dibromophenyl)phosphate, tris(4-bromophenyl) phosphate and the like.

The aromatic phosphate-based flame retardants include triphenyl phosphate, tris(2,6-xylyl)phosphate, resorcinol bis (dixylenylphosphate), hydroquinone bis (dixylenylphosphate), 4,4'-biphenol bis (dixylenylphosphate), bisphenol A bis (dixylenylphosphate), resorcinol bis (diphenylphosphate), hydroquinone bis (diphenylphosphate), 4,4'-biphenol bis (diphenylphosphate), bisphenol A bis (diphenylphosphate), aromatic polyphosphates obtained from resorcin and phenol as aromatic ring sources and containing no phenolic OH group, aromatic polyphosphates obtained from resorcin and phenol as aromatic ring sources and containing a phenolic OH group, aromatic polyphosphates obtained from hydroquinone and phenol as aromatic ring sources and containing no phenolic OH group, aromatic polyphosphates obtained from hydroquinone and phenol as aromatic ring sources and containing a phenolic OH group, (the following aromatic polyphosphates means aromatic polyphosphates containing a phenolic OH group and aromatic polyphosphates containing no phenolic OH group) aromatic polyphosphates obtained from bisphenol A and phenol as aromatic ring sources, aromatic polyphosphates obtained from resorcin and 2,6-xylenol as aromatic ring sources, aromatic polyphosphates obtained from hydroquinone and 2,6-xylenol as aromatic ring sources, aromatic polyphosphates obtained from bisphenol A and 2,6-xylenol as aromatic ring sources, and the like.

Out of the above flame retardants, tetrabromobisphenol A polycarbonate and tetrabromobisphenol A-bisphenol A copolycarbonate are preferred and tetrabromobisphenol A polycarbonate flame retardant is more preferred as halogenated bisphenol A polycarbonate flame retardants. Potassium perfluorobutane sulfonate, dipotassium diphenylsulfone-3,3'-disulfonate, potassium diphenylsulfone-3-sulfonate and sodium 2,4,5-trichlorobenzene sulfonate are preferred as organic salt-based flame retardants. Triphenyl phosphate, tricresyl phosphate, cresyl diphenyl phosphate, resorcinol bis (dixylenylphosphate) and bisphenol A bis (diphenylphosphate) are preferred as aromatic phosphoric ester-based flame retardants.

Other flame retardants include halogen-based flame retardants such as brominated bisphenol-based epoxy resins, brominated bisphenol-based phenoxy resins, brominated polystyrene, brominated crosslinked polystyrene, brominated polyphenylene ethers and polydibromophenylene ethers, red phosphorus-based flame retardants typified by red phosphorus and stabilized red phosphorus obtained by microcapsulating red phosphorus in a known thermosetting resin and/or inorganic material, silicone-based flame retardants typified by (poly)organosiloxane compounds containing a phenyl group, vinyl group or methyl group and copolymers of a (poly)organosiloxane and a polycarbonate resin, and phosphazene polymer-based flame retardants typified by phenoxy phosphazene oligomers and cyclic phenoxy phosphazene oligomers.

Out of the above flame retardants, preferred are aromatic phosphate-based flame retardants having a 5% weight reduction temperature of 300° C. or more measured by TGA (Thermogravimetric Analysis) in a nitrogen gas atmosphere when the temperature is elevated from 23° C. to 600° C. at a rate of 20° C./min.

These flame retardants have a plasticizing effect for aromatic polycarbonate resins. Therefore, the breakage of the wollastonite particle at the time of melt kneading is further suppressed. Since transferability at the time of molding improves, they are also effective in the suppression of the formation of projecting foreign matter. Further, a flame retardant having the above weight reduction temperature is also excellent in thermal stability. Therefore, when it is melt kneaded repeatedly, its volatilization from the resin composition and its thermal decomposition rarely occur. Further, the hydrolysis resistance (moist heat resistance) of the aromatic polycarbonate resin caused by the hydrolysis of the aromatic phosphate-based flame retardant is greatly improved when the flame retardant is used in conjunction with the wollastonite particle. As a result, a resin composition having excellent recyclability is obtained owing to the above effect.

Preferred examples of the resin component to be mixed with a flame retardant are a resin component consisting of only the aromatic polycarbonate resin (component A), a resin component consisting of the aromatic polycarbonate resin (component A) and the aromatic polyester resin (component B-1), and a resin component consisting of the aromatic polycarbonate resin (component A) and the styrene unit component-containing resin having a rubber component content of less than 40 wt % (component B-2).

Out of these, the resin component consisting of the component A and the component B-2 is particularly preferred. Since this resin component has high fluidity, high impact strength, little warpage and platability, it is suitably used to obtain thin molded housings for electronic and electric equipment which require high flame retardancy.

The aromatic polycarbonate resin composition of the present invention may contain polytetrafluoroethylene (may be abbreviated as PTFE hereinafter) as component H to further improve flame retardancy.

PTFE having fibril forming ability has an extremely high molecular weight and shows a tendency that PTFE's are bonded together by an external action such as shearing force to form a fiber. The number average molecular weight obtained from standard specific gravity of PTFE is preferably 1,000,000 to 10,000,000, more preferably 2,000,000 to 9,000,000. PTFE may be used in a solid form or aqueous dispersion form. A mixture of PTFE having fibril forming ability and another resin may be used to improve the dispersibility of PTFE in a resin and obtain higher flame retardancy and mechanical properties.

Commercially available products of PTFE having fibril forming ability include Teflon 6J of Mitsui-Dupont Fluorochemicals Co., Ltd., Polyfureon MPA FA500 and F-201L of Daikin Industries, Ltd., and the like. Typical commercially available products of PTFE in an aqueous dispersion form include Fluon AD-1 and AD-936 of Asahi-ICI Fluoropolymers Co., Ltd., Polyfureon D-1 and D-2 of Daikin Industries, Ltd., Teflon 30J of Misui-Dupont Fluorochemicals Co., Ltd. and the like. Commercially available products of the mixture of PTFE include Metablen A3000 of Mitsubishi Rayon Co., Ltd., BLENDEX 449 of GE Specialty Chemical Co., Ltd., and the like.

The amount of PTFE as the component H is preferably 0.05 to 3 parts by weight, more preferably 0.08 to 1.5 parts by weight, much more preferably 0.1 to 1.0 part by weight based on 100 parts by weight of the total of the component A and optionally the component B.

The aromatic polycarbonate resin composition of the present invention may contain a small amount of an inorganic filler or heat resistant organic filler in addition to the component C of the present invention.

Examples of the inorganic filler include fibrous fillers such as glass fiber (chopped strand), carbon fiber, metal fiber, xonotlite, potassium titanate whisker, aluminum borate whisker and basic magnesium sulfate whisker; flaky fillers such as talc, mica, glass flake and graphite flake; particulate fillers such as glass short fiber (milled fiber), carbon short fiber, glass bead, glass balloon, ceramic balloon, carbon bead, silica particle, titania particle, alumina particle, kaolin, clay, calcium carbonate, titanium oxide, cerium oxide and zinc oxide; and inorganic fillers obtained by coating the above inorganic fillers with a metal typified by gold, silver, nickel, copper, chromium and aluminum, or a metal oxide typified by titanium oxide, iron oxide, tin oxide, zirconium oxide and cerium oxide by methods such as plating, vapor deposition, and plating.

The heat resistant organic filler does not melt at the molding temperature of the aromatic polycarbonate resin as the component A of the present invention. Examples of the filler include fibrous fillers such as aramide fiber and polyarylate fiber, and particulate fillers such as aramide powder, polytetrafluoroethylene powder, phenol resin particle, crosslinked styrene particle and crosslinked acryl particle.

The aromatic polycarbonate resin composition of the present invention may contain a phosphorus-based heat stabilizer, antioxidant, ultraviolet light absorber, release agent, antistatic agent, foaming agent, dye, pigment and the like. Although an aromatic polycarbonate resin composition can be suitably formulated for each purpose, an aromatic polycarbonate resin composition containing a phosphorus-based heat stabilizer is particularly preferred.

The phosphorus-based heat stabilizer is phosphorous acid, phosphoric acid, phosphonous acid, phosphonic acid or ester thereof. Illustrative examples of the phosphorus-based heat stabilizer include phosphite compounds such as triphenyl phosphite, tris (nonylphenyl) phosphite, tris(2,4-di-tert-butylphenyl)phosphite, tridecyl phosphite, trioctyl phosphate, trioctadecyl phosphite, didecylmonophenyl phosphate, dioctylmonophenyl phosphite, diisopropylmonophenyl phosphate, monobutyldiphenyl phosphate, monodecyldiphenyl phosphate, monooctyldiphenyl phosphite, bis(2,6-di-tert-butyl-4-methylphenyl) pentaerythritol diphosphite, 2,2-methylenebis (4,6-di-t-butylphenyl) octylphosphite, bis(nonylphenyl) pentaerythritol diphosphite and bis (2,4-di-tert-butylphenyl) pentaerythritol diphosphite; phosphate compounds such as tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate; and phosphonite compounds such as tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite and bis(2,4-di-tert-butylphenyl)-4-biphenylene phosphonite.

Out of these, trisnonylphenyl phosphate, distearyl pentaerythritol diphosphite, bis(2,4-di-tert-butylphenyl) pentaerythritol diphosphite, bis(2,6-di-tert-butyl-4-methylphenyl)pentaerythritol diphosphite, tris(2,4,-di-tert-butylphenyl)phosphite, triphenyl phosphate, trimethyl phosphate, tetrakis(2,4-di-tert-butylphenyl)-4,4'-biphenylene diphosphonite and bis(2,4-di-tert-butylphenyl)-4-biphenylene phosphonite are preferred.

These heat stabilizers may be used alone or in admixture of two or more. The amount of the heat stabilizer is preferably 0.0001 to 1 part by weight, more preferably 0.0005 to 0.5 part by weight, much more preferably 0.002 to 0.3 part by weight based on 100 parts by weight of the total of the component A and optionally the component B.

When the resin component consists of the aromatic polycarbonate resin (component A) and the aromatic polyester resin (component B-1), pentaerythritol diphosphite compounds such as distearyl pentaerythritol diphosphite, bis(2,4-di-tert-butylphenyl)pentaerythritol diphosphite and bis(2,6-di-tert-butyl-4-methylphenyl)pentaerythritol diphosphite are preferred out of these.

The reason why they are preferred is as follows. A reduction in the molecular weight of the aromatic polycarbonate resin as the component A of the resin component consisting of the components A and B-1 readily occurs along with the ester exchange reaction between the components A and B-1 at the time of melt kneading. The ester exchange reaction is promoted by the existence of a silicate filler such as a wollastonite. The pentaerythritol diphosphite compounds are hydrolyzed more easily than other phosphate compounds. The acid component formed by hydrolysis suppresses the effect of promoting the ester exchange reaction of the wollastonite, thereby making it possible to obtain an aromatic polycarbonate resin composition which rarely experiences a reduction in molecular weight.

The amount of the pentaerythritol diphosphite compound is preferably 0.005 to 1 part by weight, more preferably 0.05 to 1 part by weight based on 100 parts by weight of the total of the components A and B-1.

Examples of the antioxidant include pentaerythritol tetrakis(3-mercapto propionate), pentaerythritol tetrakis(3-laurylthiopropionate), glycerol-3-stearyl thiopropionate, triethylene glycol-bis[3-(3-t-butyl-5-methyl-4-hydroxyphenyl)propionate], 1,6-hexanediol-bis[3-(3,5-di-t-butyl-4-hydroxyphenyl)propionate], pentaerythritol-tetrakis[3-(3,5-di-t-butyl-4-hydroxyphen yl)propionate], octadecyl-3-(3,5-di-t-butyl-4-hydroxyphenyl)propionate, 1,3,5-trimethyl-2,4,6-tris(3,5-di-t-butyl-4-hydroxybenzyl) benzene, N,N-hexamethylenebis (3,5-di-t-butyl-4-hydroxyhydrocinnamide), diethyl 3,5-di-t-butyl-4-hydroxybenzylphosphonate ester, tris(3,5-di-t-butyl-4-hydroxybenzyl)isocyanurate, tetrakis(2,4-di-t-butylphenyl)-4,4'-biphenylene diphosphonate, 3,9-bis{1,1-dimethyl-2-[β-(3-t-butyl-4-hydroxy-5-methylphenyl)propionyloxy]ethyl}-2,4,8,10-tetraoxaspiro(5,5)undecane and the like. The amount of the antioxidant is preferably 0.0001 to 1 part by weight based on 100 parts by weight of the total of the component A and optionally the component B.

Examples of the ultraviolet light absorber include benzophenone-based ultraviolet light absorbers typified by 2,2'-dihydroxy-4-methoxybenzophenone; and benzotriazole-based ultraviolet light absorbers typified by 2-(3-tert-butyl-5-methyl-2-hydroxyphenyl)-5-chlorobenzotriazole, 2-(3,5-di-tert-butyl-2-hydroxyphenyl)-5-chlorobenzotriazole, 2,2'-methylenebis[4-(1,1,3,3-tetramethylbutyl)-6-(2H-benzotriazol-2-yl)phenol], 2-[2-hydroxy-3,5-bis(α, α-dimethylbenzyl)phenyl]-2H-benzotriazole and 2-(3,5-di-tert-amyl-2-hydroxyphenyl) benzotriazole. Hindered amine-based optical stabilizers typified by bis(2,2,6,6-tetramethyl-4-piperidyl)sebacate and bis(1,2,2,6,6-pentamethyl-4-piperidyl)sebacate may also be used. Further, hydroxyphenyl triazine-based compounds such as 2-(4,6-diphenyl-1,3,5-triazine-2-yl)-5-hexyloxyphenol and 2-(4,6-bis(2,4-dimethylphenyl)-1,3,5-triazine-2-yl)-5-hexyloxyphenol may also be used. The amount of the ultraviolet light absorber or optical stabilizer is preferably is 0.01 to 5 parts by weight based on 100 parts by weight of the total of the component A and optionally the component B.

To further improve releasability from a metal mold at the time of melt molding, the thermoplastic resin composition of the present invention may be blended with a release agent in limits not prejudicial to the object of the present invention. Examples of the release agent include olefin wax, silicone oil, organopolysiloxane, higher fatty acid ester of a monohydric or polyhydric alcohol, paraffin wax, beeswax and the like. The amount of the release agent is preferably 0.01 to 2 parts by weight based on 100 parts by weight of the total of the component A and optionally the component B.

To produce the thermoplastic resin composition of the present invention, any method is employed. For example, the components A and C and optionally other components are pre-mixed and melt kneaded together and then pelletized. The pre-mixing means is a tumbler, V-shaped blender, Henschel mixer, Nauta mixer, ribbon mixer, mechanochemical device, extrusion mixer or the like. An extrusion granulator or briquetting machine may be used for granulation in the pre-mixing step. After pre-mixing, a melt kneader typified by a vented twin-screw extruder is used to melt knead the above components and a pelletizer is used to pelletize the obtained product.

The components A and C and optionally other components may be supplied into a melt kneader typified by twin-screw extruder independently without pre-mixing. Some of the components A and C and optionally other components may be pre-mixed together and supplied into a melt kneader together with the remainder. For example, the component C may be supplied into an extruder using a side feeder independently. The pre-mixing means and granulation are the same as described above.

When components to be mixed together include a liquid component, a so-called liquid injector or liquid adder may be used to supply it into a melt kneader. To supply a compound having a relatively low melting point such as an aromatic phosphate-based flame retardant, it is liquefied by heating and the obtained liquid is supplied into a melt kneader by a liquid injector or liquid adder.

When the resin component consists of the components A and B-1, the amount of water contained in the components A and B-1 before melt kneading is preferably small. Therefore, it is preferred to melt knead the component A or B-1 which has been dried by hot air or electromagnetic waves or under vacuum. Vent suction is preferably carried out at a not so high degree of vacuum during melt kneading. Volatiles may be discharged to the outside of the system while nitrogen gas and the like is caused to circulate in a state close to the atmospheric pressure.

Various products can be produced by obtaining moldings by injection molding pellets of the thermoplastic resin composition of the present invention. In the injection molding, not only general cold runner molding but also hot runner molding which eliminates the need of a runner can be employed to produce the moldings. In injection molding, gas assist injection molding, injection compression molding, ultra high speed injection molding, injection press molding, insert molding, molding with local high-temperature metal mold (including molding with insulated metal mold), sandwich molding, two-color molding and the like can be employed in addition to general molding.

According to the present invention, there are provided moldings formed from an aromatic polycarbonate resin composition which comprises 100 parts by weight of a resin component consisting of (1) 50 to 100 wt % of an aromatic polycarbonate resin (component A) and (2) 0 to 50 wt % of at least one thermoplastic resin (component B) selected from the group consisting of a thermoplastic polyester resin (component B-1) and a styrene unit component-containing resin having a rubber component content of less than 40 wt % (component B-2), and (3) 1 to 100 parts by weight of wollastonite particles (component C) having such particle shape characteristics that the particles have a number average fiber length measured by the method specified in this text of 10 $\mu$m or less and a number average fiber diameter measured by the method specified in this text of 4 $\mu$m or less and include particles having a fiber length of 5 to 25 $\mu$m in a number proportion of less than 50% of the total.

Stated more specifically, there are provided the following moldings. That is, (i) a molding formed from an aromatic polycarbonate resin composition which comprises a resin component consisting of the above component A and 1 to 100 parts by weight of the above component C based on 100 parts by weight of the resin component, (ii) a molding formed from an aromatic polycarbonate resin composition which comprises a resin component consisting of the above components A and B-1 and 1 to 100 parts by weight of the above component C based on 100 parts by weight of the resin component, and (iii) a molding formed from an aromatic polycarbonate resin composition which comprises a resin component consisting of the above components A and B-2 and 1 to 100 parts by weight of the above component C based on 100 parts by weight of the resin component.

Preferably, there are provided coated moldings formed from the above polycarbonate resin compositions.

The thus obtained moldings of the present invention have excellent surface appearance, impact strength, stiffness and recyclability. More specifically, the moldings have a retention of recyclability defined in the following Examples of at least 85%, preferably 90%, more preferably 93%.

As described above, the present invention provides an aromatic polycarbonate resin composition which has high stiffness, high impact resistance, a good surface appearance and excellent recyclability. The characteristic properties of the resin composition are useful in a wide variety of industrial fields and application purposes and particularly useful in the following fields.

Firstly, the resin composition can be used in car interior parts and car exterior parts. This field requires an especially good surface appearance. The car interior parts include center panels, instrumental panels, dash boards, inner door handles, rear boards, and display housings for car navigation and car TV sets.

The car exterior parts include outer door handles, fender panels, door panels, spoilers, garnishes, pillar covers, front grilles, rear body panels, cowls for motor bicycles, and covers for the load carrying platforms of trucks. When a resin component consists of an aromatic polycarbonate resin and a thermoplastic polyester resin or when a resin component consists of an aromatic polycarbonate resin and a styrene unit component-containing resin having a rubber component content of less than 40 wt %, the resulting resin composition is particularly suitable for use in these parts. When a resin component consists of an aromatic polycarbonate resin and a thermoplastic polyester resin, the obtained resin composition is further superior in chemical resistance and fatigue strength and therefore particularly suitable for use in outer door handles which require these characteristic properties. A resin component which consists of an aromatic polycarbonate resin and a styrene unit component-containing resin having a rubber component content of less than 40 wt % is advantageous in terms of impact resistance and superior in moldability, the obtained resin composition is suitable for use in large-sized moldings such as door panels.

Secondly, the resin composition can be used in housing parts for portable precision instruments. The portable precision instruments include cameras, digital cameras, video movie players, telescopes, binoculars, portable telephones, personal disital assistant, portable notebook computer, portable tape recorders, portable optical disk players, portable navigation systems and wristwatches. The housing parts are being thinned and require high stiffness and high dimensional accuracy for positioning a precision part. Further, as these portable precision instruments are carried, high impact resistance is required and an excellent surface appearance is required to provide a high-grade impression. A resin component which consists of an aromatic polycarbonate resin and a styrene unit component-containing resin having a rubber component content of less than 40 wt % is suitable for housing parts. The resin component is advantageous for thin products in terms of dimensional accuracy and impact resistance.

Thirdly, the resin composition can be used in housing parts for OA equipment. The OA equipment include notebook computer, personal computer bodies, CRT displays, printers, copies, drive units for recording media (such as CD and DVD), scanners and facsimiles. Since these parts require flame retardancy, a resin component which consists of an aromatic polycarbonate resin or a resin component which consists of an aromatic polycarbonate resin and a styrene unit component-containing resin having a rubber component content of less than 40 wt % is particularly suitable. The flame retardant is preferably a phosphorus-based flame retardant such as aromatic phosphate-based flame retardant, red phosphorus or phosphazene polymer-based flame retardant. When the resin component consists of an aromatic polycarbonate resin, a silicone-based flame retardant or organic salt-based flame retardant is preferred. A resin composition comprising a resin component which consists of an aromatic polycarbonate resin and a styrene unit component-containing resin having a rubber component content of less than 40 wt % and an aromatic phosphate-based flame retardant (particularly a phosphate oligomer) as a flame retardant is particularly useful from the viewpoints of flame retardancy and moldability.

Figure 1:
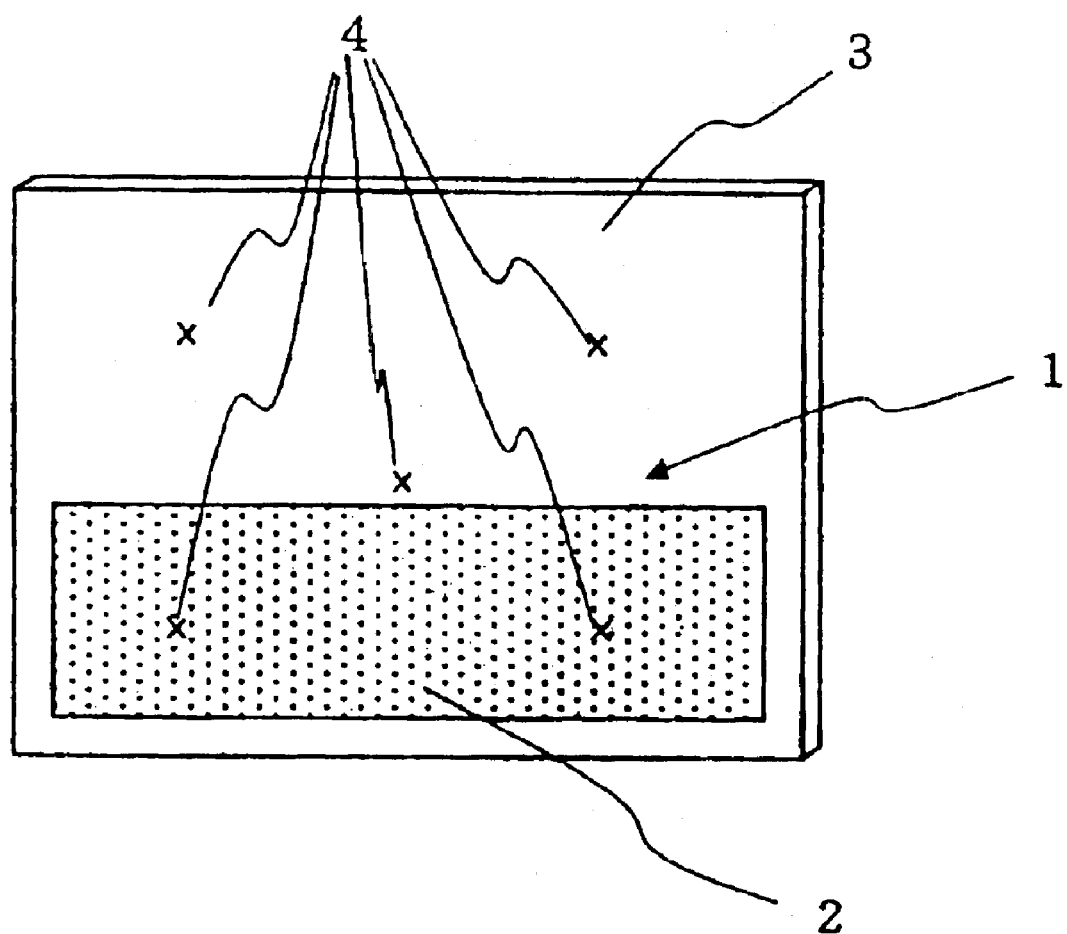
FIG. 1 is a schematic perspective view of the front side of a molded product after the model of a housing for a portable notebook computer used in Examples (length of 178 mm, width of 245 mm, height of 10 mm).

1 molded product body after the model of a housing for a notebook personal computer
2 matted surface portion
3 mirror portion
4 gate (rear side of molded product, pin gate of 0.8 mm in diameter, 5 locations)

EXAMPLES

The following examples are given to further illustrate the present invention. Evaluations were made in accordance with the following methods.

(1) surface appearance; 100 front side cover molded products (having a mirror portion and a grain pattern portion) for a portable notebook computer shown in FIG. 1 were formed. Whether projecting foreign matter was formed or not was checked visually for all the molded products to evaluate the surface appearance of each molded product based on the following criteria.

⊚: No projecting foreign matter is observed

○: Projecting foreign matter is observed in less than 10% of the total number of molded products.

Δ: Projecting foreign matter is observed in 10% or more and less than 50% of the total number of molded products.

X: Projecting foreign matter is observed in 50% or more of the total number of molded products.

Three molded products were selected from molded products obtained from each sample, spray coated with the R-230 Dover White of Nippon Bee Chemical Co., Ltd. in a coating booth, and dried at 80° C. for 1 hour to obtain coated molded products. The surface roughness of the mirror portion of the coated molded products was measured and an average value was obtained from the measurement values. The measurement was carried out by a universal surface shape measuring instrument (SURFCOM 3B. E-MD-S10A of Tokyo Seimitsu Co., Ltd.) at a tracer diameter of 2 μm and a tracer pressure of 0.07 g to calculate the average surface roughness (Ra). It can be judged that the surface appearance is better as the value of average surface roughness (Ra) becomes smaller. The thickness of the coating film was 30 μm.

(2) impact strength; The notched Izod impact strength of a 1/8" test sample was measured at 23° C. in accordance with ASTM D256.

(3) stiffness; A flexural test was made in accordance with ASTM D790 to measure flexural modulus.

(4) recyclability; A molded product for a flexural test was crushed at a processing rate of 70 kg/h by a crusher (SB-210 of Horai Co., Ltd.) and repelletized. The obtained pellets were injection molded again. This operation consisting of crushing, repelletization and molding was repeated 5 times, an ASTM D790-based flexural test was made on a test sample obtained after fifth injection molding to measure its flexural modulus (FM5), and the retention of the flexural modulus (FM1) obtained in (3) was calculated from the following expression.

$$\text{retention } (\%) = (FM5/FM1) \times 100$$

It can be judged that recyclability is better as the retention becomes higher.

(5) flame retardancy; A vertical flaming test was made on 1 mm thick and 1.3 mm thick test samples in accordance with UL standard 94V to evaluate flammability.

Examples 1 to 59 and Comparative Examples 1 to 14

Components shown in Tables 2 to 10 were mixed together in a ratio shown in these tables by a V-shaped blender and the obtained mixture was pelletized by a vented twin-screw extruder having a screw diameter of 30 mm [KTX-30 of Kobe Steel, Ltd.] at a cylinder temperature of 270° C. and a vent suction degree of 3 kPa. Out of the components, an aromatic polycarbonate resin and an aromatic polyester resin which were dried with hot air at 120° C. for 5 hours were used and trimethyl phosphate (TMP of Daihachi Chemical Industry Co., Ltd.) was added to all the samples in an amount of 0.03 part by weight based on 100 parts by weight of the total of the components A and B. The pellets were dried at 100 to 110° C. for 6 hours to form test samples by an injection molding machine [T-150D of FANUC Ltd.] at a cylinder temperature of 270° C. and a mold temperature of 80° C. The evaluation results are shown in Tables 2 to 10.

The melt viscosity in the tables is a value at 300 sec$^{-1}$ read from a shear rate/viscosity curve which is obtained by measuring a resin composition comprising components A and B shown in the tables and obtained using the above extruder with a capillary rheometer (Capirograph of Toyo Seiki Seisaku-syo Co., Ltd.) at a capillary length of 10.0 mm and a capillary diameter of 1.0 mm and a measurement temperature of 260° C. by changing the measurement rate.

(Component A)

(1) PC-1: linear aromatic polycarbonate resin having a viscosity average molecular weight of 25,000 produced from bisphenol A and phosgene (Panlite L-1250 of Teijin Chemicals, Ltd.)

(2) PC-2: linear aromatic polycarbonate resin having a viscosity average molecular weight of 30,000 produced from bisphenol A and phosgene (Panlite K-1300 of Teijin Chemicals, Ltd.)

(3) PC-3: aromatic polycarbonate resin having a viscosity average molecular weight of 23,300 produced by the following melt ester exchange method 228 parts of 2,2-bis(4-hydroxyphenyl)propane, 220 parts (about 1.03 mols/1 mol of bisphenol A) of diphenyl carbonate (Bayer AG), and 0.000024 part (about 6×10$^{-7}$ mol/1 mol of bisphenol A) of sodium hydroxide and 0.0073 part (about 8×10$^{-5}$ mol/1 mol of bisphenol A) of tetramethylammonium hydroxide as catalysts were charged into a reactor equipped with a stirrer and fractionating column and the inside of the reactor was substituted with nitrogen. This mixture was heated at 200° C. and molten under agitation. After most of the formed phenol was distilled off in an hour under heating at a reduced pressure of 4 KPa and a polymerization reaction was carried out for 2 hours by further elevating the temperature to 270° C. and at a reduced pressure of 1 Torr. 0.0035 part (about 6×10$^{-6}$ mols/1 mol of bisphenol A) of tetrabutylphosphonium dodecylbenzene sulfonate in a molten state was then added as a catalyst neutralizer to continue the reaction at 270° C. and 1.33 KPa or less so as to obtain an aromatic polycarbonate resin having a viscosity average molecular weight of 23,300 and a terminal hydroxyl group concentration of 34 mol %. This aromatic polycarbonate resin was supplied into an extruder by a gear pump. 0.008 wt % of tris (2,4-di-tert-butylphenyl)phosphite was added before the extruder to obtain an aromatic polycarbonate resin pellet. This was designated as PC-3.

(Component B)

(component B-1)

(1) PET: polyethylene terephthalate resin (TR-8580 of Teijin Limited having an intrinsic viscosity of 0.8)

(2) PBT: polybutylene terephthalate resin (TRB-H of Teijin Limited having an intrinsic viscosity of 1.07)

(component B-2)

(3) ABS-1: ABS resin (Santac UT-61 of NIPPON A & L Inc.)

(4) ABS-2: ABS resin (Santac AT-05 of NIPPON A & L Inc.)

(5) ABS-3: ABS resin (Cycolac Y-540A of Ube Cycon Ltd.)

(6) AS: Litac 980PC of NIPPON A & L Inc., weight average molecular weight of about 130,000

(Component C)

Wollastonite particles W-1 to W-7 having characteristic properties shown in Table 1 below were used.

(2) D-2: copolymer obtained by graft copolymerizing ethyl acrylate/methyl methacrylate with butadiene rubber in a ratio of 1/4 (Paraloid EXL-2602 of Kureha Chemical Industry Co., Ltd.)

(3) D-3: ABS copolymer obtained by graft polymerizing butadiene rubber, styrene and acrylonitrile and having a butadiene component content of 60 wt % (UCL Modifier Resin B600N of Ube Cycon Co., Ltd.)

(Component E)

(1) Wax: olefin-based wax containing a copolymer component of an α-olefin and maleic anhydride (Diacarna PA30M of Mitsubishi Chemical Corporation, maleic anhydride content of 10 wt %)

(Component G)

(1) FR-1: resorcinol bis(dixylenylphosphate) (Adekastab FP-500 of Asahi Denka Kogyo K.K., TGA 5% weight reduction temperature=351.0° C.)

(2) FR-2: triphenyl phosphate (TPP of Daihachi Chemical Industry Co., Ltd., TGA 5% weight reduction temperature= 239.4° C.)

(3) FR-3: halogen-based flame retardant (tetrabromobisphenol A carbonate oligomer, Fireguard FG7000 of Teijin Chemicals Ltd.)

TABLE 1

| | unit | W-1 | W-2 | W-3 | W-4 | W-5 | W-6 | W-7 |
|---|---|---|---|---|---|---|---|---|
| number proportion of particles having a fiber length of 5 to 25 μm | % | 44.3 | 45.8 | 44.9 | 44.3 | 44.9 | 25.6 | 33.0 |
| number average fiber length | μm | 6.7 | 6.3 | 6.7 | 8.3 | 8.3 | 7.0 | 25.0 |
| number average fiber diameter | μm | 1.7 | 1.5 | 1.6 | 2.6 | 2.4 | 5.2 | 14.5 |
| ignition loss | wt % | 1.0 | 1.0 | 1.8 | 0.9 | 1.7 | 1.2 | 0.8 |
| number proportion of particles having a fiber length of more than 25 μm | % | 2.6 | 1.8 | 2.5 | 5.5 | 5.7 | 8.0 | 28.0 |
| proportion of particles passing through 325-mesh sieve | wt % | 99.98 | 99.95 | 99.99 | — | — | — | — |

(Component D)

(1) D-1: composite rubber-based graft copolymer obtained by graft polymerizing at least one vinyl-based monomer with a composite rubber having such a structure that a polyorganosiloxane rubber component and a polyalkyl (meth)acrylate rubber component are entangled with each other so that they cannot be separated from each other (Metablen S-2001 of Mitsubishi Rayon Co., Ltd.)

(Component H)

(1) PTFE: polytetrafluoroethylene having fibril forming ability (Polyfureon MPA FA-500 of Daikin Industries, Ltd.)

(other additives)

(1) ST: cyclic neopentanetetraylbis(octadecylphosphite) (Adekastab PEP-8 of Asahi Denka Kogyo K.K.)

TABLE 2

| | | | | examples | | | | | | | | | |
|---|---|---|---|---|---|---|---|---|---|---|---|---|---|
| | | | unit | 1 | 2 | 3 | 4 | 5 | 6 | 7 | 8 | 9 | 10 |
| composition | component A | PC-1 | wt % | 100 | 100 | 100 | 100 | | | 100 | 100 | 100 | 100 |
| | | PC-2 | wt % | | | | | 100 | | | | | |
| | | PC-3 | wt % | | | | | | 100 | | | | |
| | total | | wt | 100 | 100 | 100 | 100 | 100 | 100 | 100 | 100 | 100 | 100 |
| | component C | W-1 | wt | 5 | 15 | 30 | 60 | 15 | 15 | 15 | 30 | 15 | 15 |
| | component D | D-1 | wt | | | | | | | | | 5 | 5 |
| | component E | Wax | wt | | | | | | | 1 | 1 | | 1 |
| evaluation | surface appearance | coating properties | — | ◎ | ◎ | ◎ | ◎ | ◎ | ◎ | ◎ | ◎ | ◎ | ◎ |
| | | Ra | μm | 0.004 | 0.005 | 0.005 | 0.006 | 0.005 | 0.005 | 0.005 | 0.005 | 0.005 | 0.004 |
| | impact strength | | J/m | 200 | 160 | 130 | 100 | 180 | 150 | 200 | 170 | 320 | 350 |
| | stiffness | | MPa | 2840 | 3210 | 3620 | 4210 | 3170 | 3260 | 3560 | 4020 | 3090 | 3450 |
| | recyclability | | % | 91 | 90 | 91 | 90 | 89 | 91 | 96 | 95 | 90 | 95 |
| | melt viscosity | | ×10³ Pa·s | 1.6 | 1.6 | 1.6 | 1.6 | 2.2 | 1.4 | 1.6 | 1.6 | 1.6 | 1.6 |

TABLE 3

| | | | | examples | | | | | | |
|---|---|---|---|---|---|---|---|---|---|---|
| | | | unit | 11 | 12 | 13 | 14 | 15 | 16 | 17 |
| composition | component A | PC-1 | wt % | 100 | 100 | 100 | 100 | | | |
| | | PC-3 | wt % | | | | | 100 | 100 | 100 |
| | total | | wt | 100 | 100 | 100 | 100 | 100 | 100 | 100 |
| | component C | W-2 | wt | 15 | | | | | | |
| | | W-3 | | | 15 | | | 15 | | |
| | | W-4 | | | | 15 | | | 15 | |
| | | W-5 | | | | | 15 | | | 15 |
| | component D | D-1 | wt | | | | | 5 | 5 | 5 |
| | component E | Wax | wt | 1 | 1 | 1 | 1 | 1 | 1 | 1 |
| evaluation | surface appearance | coating properties | — | ○ | ⊚ | ○ | ○ | ⊚ | ○ | ○ |
| | | Ra | μm | 0.005 | 0.005 | 0.006 | 0.005 | 0.005 | 0.005 | 0.006 |
| | impact strength | | J/m | 210 | 210 | 190 | 210 | 360 | 310 | 350 |
| | stiffness | | MPa | 3540 | 3480 | 3600 | 3460 | 3380 | 3580 | 3400 |
| | recyclability | | % | 96 | 89 | 95 | 91 | 89 | 96 | 91 |
| | melt viscosity | | ×10³ Pa·s | 1.6 | 1.6 | 1.6 | 1.6 | 1.4 | 1.4 | 1.4 |

TABLE 4

| | | | | examples | | | | | | | |
|---|---|---|---|---|---|---|---|---|---|---|---|
| | | | unit | 1 | 2 | 3 | 4 | 5 | 6 | 7 | 8 |
| composition | component A | PC-1 | wt % | 100 | 100 | 100 | | 100 | 100 | 100 | 100 |
| | | PC-2 | wt % | | | | 100 | | | | |
| | | PC-3 | wt % | | | | | | | | |
| | total | | wt | 100 | 100 | 100 | 100 | 100 | 100 | 100 | 100 |
| | component C | W-1 | wt | | 110 | | | | | | |
| | | W-6 | wt | | | 15 | 15 | 15 | 30 | 15 | |
| | | W-7 | wt | | | | | | | | 15 |
| | component D | D-1 | wt | | | | | | | 5 | 5 |
| | component E | Wax | wt | | | | | | 1 | 1 | |
| evaluation | surface appearance | coating properties | — | ⊚ | Δ | X | X | X | X | X | X |
| | | Ra | μm | 0.005 | 0.015 | 0.023 | 0.022 | 0.021 | 0.025 | 0.022 | 0.036 |
| | impact strength | | J/m | 780 | 18 | 210 | 220 | 230 | 190 | 280 | 56 |
| | stiffness | | MPa | 2230 | 5630 | 2500 | 2480 | 2520 | 2710 | 2430 | 3120 |
| | recyclability | | % | — | 84 | 90 | 89 | 92 | 91 | 89 | 66 |
| | melt viscosity | | ×10³ Pa·s | 1.6 | 1.6 | 1.6 | 2.2 | 1.6 | 1.6 | 1.6 | 1.6 |

TABLE 5

| | | | | examples | | | | | | | | | | | |
|---|---|---|---|---|---|---|---|---|---|---|---|---|---|---|---|
| | | | unit | 18 | 19 | 20 | 21 | 22 | 23 | 24 | 25 | 26 | 27 | 28 | 29 |
| composition | component A | PC-1 | wt % | 85 | 70 | 55 | 85 | 70 | 55 | 70 | 70 | 70 | 70 | 70 | 70 |
| | component B | PET | wt % | 15 | 30 | 45 | | | | | | | | 5 | 25 |
| | | PBT | wt % | | | | 15 | 30 | 45 | 30 | 30 | 30 | 30 | 25 | 5 |
| | total | | wt | 100 | 100 | 100 | 100 | 100 | 100 | 100 | 100 | 100 | 100 | 100 | 100 |
| | component C | W-1 | wt | 15 | 15 | 15 | 15 | 15 | 15 | 30 | 60 | 15 | 15 | 15 | 15 |
| | component D | D-1 | wt | | | | 5 | 5 | 5 | 5 | 5 | | 5 | 5 | 5 |
| | component E | Wax | wt | | | | | | | | | 1 | 1 | 1 | 1 |
| | others | ST | wt | 0.1 | 0.1 | 0.1 | 0.1 | 0.1 | 0.1 | 0.1 | 0.1 | 0.1 | 0.1 | 0.1 | 0.1 |
| evaluation | surface appearance | coating properties | — | ⊚ | ⊚ | ⊚ | ⊚ | ⊚ | ⊚ | ⊚ | ⊚ | ⊚ | ⊚ | ⊚ | ⊚ |
| | | Ra | μm | 0.004 | 0.004 | 0.005 | 0.004 | 0.005 | 0.005 | 0.004 | 0.005 | 0.004 | 0.004 | 0.004 | 0.005 |
| | impact strength | | J/m | 150 | 130 | 250 | 300 | 280 | 260 | 190 | 110 | 170 | 300 | 290 | 300 |
| | stiffness | | MPa | 3330 | 3410 | 3270 | 3110 | 3200 | 3190 | 3510 | 4030 | 3650 | 3490 | 3510 | 3520 |
| | recyclability | | % | 89 | 90 | 91 | 90 | 90 | 92 | 91 | 90 | 95 | 96 | 97 | 95 |
| | melt viscosity | | ×10³ Pa·s | 1.1 | 0.86 | 0.57 | 0.95 | 0.74 | 0.36 | 0.86 | 0.86 | 0.86 | 0.86 | 0.88 | 0.91 |

TABLE 6

|  |  |  | unit | examples ||||||| comparative examples ||
|---|---|---|---|---|---|---|---|---|---|---|---|
|  |  |  |  | 30 | 31 | 32 | 33 | 34 | 35 | 9 | 10 |
| composition | component A | PC-1 | wt % | 55 | 55 | 70 | 70 | 70 | 70 | 55 | 70 |
|  | component B | PET | wt % | 45 | 45 | 5 | 5 | 5 | 5 | 45 | 5 |
|  |  | PBT | wt % |  |  | 25 | 25 | 25 | 25 |  | 25 |
|  | total |  | wt | 100 | 100 | 100 | 100 | 100 | 100 | 100 | 100 |
|  | component C | W-2 | wt | 15 |  | 15 |  |  |  |  |  |
|  |  | W-3 | wt |  | 15 |  | 15 |  |  |  |  |
|  |  | W-4 | wt |  |  |  |  | 15 |  |  |  |
|  |  | W-5 | Wt |  |  |  |  |  | 15 |  |  |
|  |  | W-6 | Wt |  |  |  |  |  |  | 15 |  |
|  |  | W-7 | wt |  |  |  |  |  |  |  | 15 |
|  | component D | D-1 | wt | 5 | 5 | 5 | 5 | 5 | 5 | 5 | 5 |
|  | component E | Wax | wt |  |  | 1 | 1 | 1 | 1 | 1 | 1 |
|  | others | ST | wt | 0.1 | 0.1 | 0.1 | 0.1 | 0.1 | 0.1 | 0.1 | 0.1 |
| evaluation | surface | coating properties | — | ○ | ◎ | ○ | ◎ | ○ | ○ | X | X |
|  | appearance | Ra | μm | 0.005 | 0.005 | 0.005 | 0.005 | 0.005 | 0.006 | 0.023 | 0.033 |
|  | impact strength |  | J/m | 240 | 260 | 290 | 310 | 270 | 310 | 290 | 98 |
|  | stiffness |  | MPa | 3280 | 3210 | 3520 | 3450 | 3600 | 3480 | 2420 | 3580 |
|  | recyclability |  | % | 91 | 89 | 97 | 92 | 96 | 91 | 90 | 67 |
|  | melt viscosity |  | ×10³ Pa·s | 0.57 | 0.57 | 0.88 | 0.88 | 0.88 | 0.88 | 0.57 | 0.88 |

TABLE 7

|  |  |  | unit | examles |||||||||
|---|---|---|---|---|---|---|---|---|---|---|---|---|
|  |  |  |  | 36 | 37 | 38 | 39 | 40 | 41 | 42 | 43 | 44 |
| composition | component A | PC-1 | wt % | 85 | 70 | 55 | 70 | 70 | 70 | 70 | 70 | 70 |
|  | component B | ABS-1 | wt % | 15 | 30 | 45 | 30 | 30 | 30 | 30 | 30 | 30 |
|  | total |  | wt | 100 | 100 | 100 | 100 | 100 | 100 | 100 | 100 | 100 |
|  | component C | W-1 | wt | 15 | 15 | 15 | 30 | 60 | 15 | 15 | 15 | 60 |
|  | component D | D-2 | wt |  |  |  |  |  | 5 |  | 5 | 5 |
|  | component E | Wax | wt |  |  |  |  |  |  | 1 | 1 | 1 |
| evaluation | surface appearance | coating properties | — | ◎ | ◎ | ◎ | ◎ | ◎ | ◎ | ◎ | ◎ | ◎ |
|  |  | Ra | μm | 0.004 | 0.005 | 0.004 | 0.005 | 0.005 | 0.004 | 0.005 | 0.005 | 0.005 |
|  | impact strength |  | J/m | 230 | 210 | 200 | 190 | 150 | 280 | 250 | 300 | 240 |
|  | stiffness |  | MPa | 3980 | 4010 | 4110 | 4680 | 4890 | 3890 | 4200 | 4110 | 4780 |
|  | recyclability |  | % | 91 | 91 | 92 | 90 | 89 | 90 | 96 | 97 | 94 |
|  | melt viscosity |  | ×10³ Pa·s | 0.8 | 0.57 | 0.29 | 0.57 | 0.57 | 0.57 | 0.57 | 0.57 | 0.57 |

TABLE 8

|  |  |  | unit | examples |||||||||
|---|---|---|---|---|---|---|---|---|---|---|---|---|
|  |  |  |  | 45 | 46 | 47 | 48 | 49 | 50 | 51 | 52 | 53 |
| composition | component A | PC-1 | wt % | 70 | 70 | 55 | 93 | 100 | 80 | 80 | 80 | 80 |
|  | component B | ABS-2 | wt % | 30 | 30 |  |  |  |  |  |  |  |
|  |  | ABS-3 | wt % |  |  | 45 |  |  |  |  |  |  |
|  |  | AS | wt % |  |  |  | 7 |  | 20 | 20 | 20 | 20 |
|  | total |  | wt | 100 | 100 | 100 | 100 | 100 | 100 | 100 | 100 | 100 |
|  | component C | W-1 | wt | 15 | 15 | 15 | 15 | 15 | 15 |  |  |  |
|  |  | W-2 | Wt |  |  |  |  |  |  | 15 |  |  |
|  |  | W-3 | wt |  |  |  |  |  |  |  | 15 |  |
|  |  | W-4 | wt |  |  |  |  |  |  |  |  | 15 |
|  | component D | D-2 | wt |  | 5 |  |  |  |  |  |  |  |
|  |  | D-3 | wt |  |  |  | 25 | 17 | 17 | 17 | 17 | 17 |
|  | component E | Wax | wt | 1 | 1 | 1 | 1 | 1 |  |  |  |  |
| evaluation | surface appearance | coating properties | — | ◎ | ◎ | ◎ | ◎ | ◎ | ◎ | ○ | ◎ | ○ |
|  |  | Ra | μm | 0.005 | 0.005 | 0.005 | 0.005 | 0.005 | 0.005 | 0.005 | 0.005 | 0.006 |
|  | impact strength |  | J/m | 260 | 300 | 250 | 430 | 420 | 220 | 210 | 240 | 200 |
|  | stiffness |  | MPa | 4240 | 4110 | 4310 | 3870 | 3200 | 4030 | 4010 | 3910 | 4100 |
|  | recyclability |  | % | 96 | 97 | 96 | 95 | 94 | 89 | 90 | 88 | 90 |
|  | melt viscosity |  | ×10³ Pa·s | 0.55 | 0.58 | 0.31 | 0.91 | 1.6 | 0.14 | 0.14 | 0.14 | 0.14 |

TABLE 9

|  |  |  | unit | comparative examples 11 | 12 | 13 | 14 |
|---|---|---|---|---|---|---|---|
| composition | component A | PC-1 | wt % | 70 | 70 | 70 | 70 |
|  | component B | ABS-1 | wt % | 30 | 30 | 30 | 30 |
|  |  | total | wt | 100 | 100 | 100 | 100 |
|  | component C | W-1 | wt | 110 |  |  |  |
|  |  | W-7 | wt |  | 15 | 15 | 15 |
|  | component D | D-2 | wt |  |  | 1 | 5 |
|  | component E | Wax | wt |  | 1 | 1 | 1 |
| evaluation | surface | coating properties | — | Δ | X | X | X |
|  | appearance | Ra | μm | 0.015 | 0.033 | 0.033 | 0.034 |
|  | impact strength |  | J/m | 30 | 200 | 230 | 280 |
|  | stiffness |  | MPa | 5100 | 3980 | 4170 | 4090 |
|  | recyclability |  | % | 83 | 61 | 63 | 65 |
|  | melt viscosity |  | ×10³ Pa·s | 0.57 | 0.57 | 0.57 | 0.57 |

TABLE 10

|  |  |  | unit | examples 54 | 55 | 56 | 57 | 58 | 59 |
|---|---|---|---|---|---|---|---|---|---|
| composition | component A | PC-1 | wt % | 85 | 85 | 85 | 85 | 85 | 85 |
|  | component B | ABS-1 | wt % | 15 | 15 | 15 |  |  |  |
|  |  | ABS-2 | wt % |  |  |  | 15 | 15 |  |
|  |  | AS | wt % |  |  |  |  |  | 15 |
|  |  | total | wt | 100 | 100 | 100 | 100 | 100 | 100 |
|  | component C | W-1 | wt | 15 | 15 | 15 | 15 | 10 | 10 |
|  | component D | D-2 | wt | 4 | 4 | 4 | 4 |  |  |
|  |  | D-3 | wt |  |  |  |  | 5 | 5 |
|  | component E | Wax | wt | 1 | 1 | 1 | 1 | 1 | 1 |
|  | component F | FR-1 | wt |  | 12 |  | 12 | 12 | 12 |
|  |  | FR-2 | wt |  |  | 8 |  |  |  |
|  |  | FR-3 | wt |  |  | 12 |  |  |  |
|  | component G | PTFE | wt |  | 0.5 | 0.5 | 0.5 | 0.5 | 0.5 |
| evaluation | surface | coating properties | — | ◉ | ◉ | ◉ | ◉ | ◉ | ◉ |
|  | appearance | Ra | μm | 0.004 | 0.003 | 0.004 | 0.004 | 0.003 | 0.003 |
|  | impact strength |  | J/m | 290 | 220 | 160 | 290 | 320 | 280 |
|  | stiffness |  | MPa | 3880 | 4200 | 4350 | 4200 | 3620 | 3700 |
|  | recyclability |  | % | 95 | 98 | 95 | 98 | 96 | 97 |
|  | flame retardancy |  | 1.0 mmt | Not-V | V-1 | V-0 | V-0 | V-0 | V-0 |
|  |  |  | 1.3 mmt | Not-V | V-0 | V-0 | V-0 | V-0 | V-0 |
|  | melt viscosity |  | ×10³ Pa·s | 0.80 | 0.80 | 0.80 | 0.76 | 0.76 | 0.16 |

As is obvious from these tables, it can be said that an aromatic polycarbonate resin composition comprising a resin component which consists of an aromatic polycarbonate resin, or an aromatic polycarbonate resin and a thermoplastic polyester resin or styrene unit component-containing resin, and wollastonite particles which satisfy the conditions of the present invention is excellent in mechanical properties such as stiffness and impact strength, surface appearance and recyclability. When wollastonite particles which do not satisfy the conditions of the present invention are used, the obtained resin composition contains a large number of projecting foreign matter and is inferior in recyclability though its coated surface has relatively high smoothness. It is also understood that the proportion of particles having a fiber length of more than 25 μm, the proportion of particles passing through a 325-mesh sieve and ignition loss affects the formation of projecting foreign matter and recyclability.

[Effect of the Invention]

The aromatic polycarbonate resin composition of the present invention is excellent in mechanical properties such as stiffness, surface appearance and recyclability and the most suitable for use in auto parts such as car outer handles, OA equipment parts and the like.

What is claimed is:

1. An aromatic polycarbonate resin composition comprising:
   (I) 100 parts by weight of a resin component consisting of (1) 50 to 100 wt % of an aromatic polycarbonate (component A) and (2) 0 to 50 wt % of at least one thermoplastic resin (component B) selected from the group consisting of a thermoplastic polyester resin (component B-1) and a styrene unit component-containing resin having a rubber component content of less than 40 wt % (component B-2); and
   (II) 1 to 100 parts by weight of wollastonite particles (component C) having such particle shape characteristics that the particles have a number average fiber length of 10 μm or less and number average fiber diameter of 4 μm or less and include particles having a fiber length of 5 to 25 μm in a number proportion of less than 50% of the total and having a fiber length of more than 25 μm in a number proportion of 5% or less of the total, and include particles passing through a 325-mesh sieve by a wet screening method in an amount of 99.96 wt % or more.

2. The aromatic polycarbonate resin composition of claim 1, wherein the resin component consists of 50 to 95 wt % of the component A and 5 to 50 wt % of the component B.

3. The aromatic polycarbonate resin composition of claim 1, wherein the wollastonite particles (component C) have a number average fiber length of 3 to 10 μm and a number average fiber diameter of 0.5 to 4 μm and include particles having a fiber length of 5 to 25 μm in a number proportion of 30% or more and less than 50% of the total.

4. The aromatic polycarbonate resin composition of claim 1, wherein the wollastonite particles (component C) have an ignition loss of 1.7 wt % or less.

5. The aromatic polycarbonate resin composition of claim 1, wherein the resin component consists of 50 to 95 wt % of the aromatic polycarbonate resin (component A) and 5 to 50 wt % of the thermoplastic polyester resin (component B-1).

6. The aromatic polycarbonate resin composition of claim 5, wherein the component B-1 is at least one selected from the group consisting of polyethylene terephthalate, polybutylene terephthalate, polyethylene naphthalate and polybutylene naphthalate.

7. The aromatic polycarbonate resin composition of claim 1, wherein the resin component consists of 50 to 95 wt % of the aromatic polycarbonate resin (component A) and 5 to 50 wt % of the styrene unit component-containing resin having a rubber component content of lows than 40 wt % (component B-2).

8. The aromatic polycarbonate resin composition of claim 7, wherein the component B-2 is at least one selected from the group consisting of polystyrene (PS resin), high-impact polystyrene (HIPS resin), acrylonitrile styrene copolymer (AS resin), acrylonitrile.butadiene.styrene copolymer (ABS resin), acrylonitrile.styrene.acrylic rubber copolymer (ASA resin) acrylonitrile.ethylene propylene.styrene copolymer (AES resin) and methyl methacrylate.butadiene.styrene copolymer (MBS resin).

9. The aromatic polycarbonate resin composition of claim 1, wherein the resin component has a melt viscosity measured at 260° C. by a capillary rheometer of $0.1 \times 10^3$ to $5 \times 10^3$ Pa·S at a shear rate of 300 sec$^{-1}$.

10. The aromatic polycarbonate resin composition of claim 1 which further contains an elastic polymer (component D) as an impact strength modifier in an amount of 0.5 to 50 parts by weight based on 100 parts by weight of the total of the components A and B.

11. The aromatic polycarbonate resin composition of claim 1 which further contains an agent (component E) for suppressing the breakage of the wollastonite particles (component C) in an amount of 0.02 to 5 parts by weight based on 100 part by weight of the total of the components A and B.

12. The aromatic polycarbonate resin composition of claim 1, which further contains a thermoplastic resin (component F) other than the components A and B in an amount of 0.5 to 20 parts by weight based on 100 parts by weight of the total of the components A and B.

13. The aromatic polycarbonate resin composition of claim 1 which further contains a flame retardant (component G) in an amount of 0.1 to 20 parts by weight based on 100 parts by weight of the total of the components A and B.

14. An aromatic polycarbonate resin composition comprising:
(I) 100 parts by weight of an aromatic polycarbonate resin (component A); and
(II) 1 to 100 parts by weight of wollastonite particles (component C) having such particle shape characteristics that the particles have a number average fiber length of 10 μm or less and a number average fiber diameter of 4 μm or less and include particles having a fiber length of 5 to 25 μm in a number proportion of less than 50% of the total and having a fiber length of more than 25 μm in a number proportion of 5% or less of the total, and include particles passing through a 325-mesh sieve by a wet screening method in an amount of 99.96 wt % or more.

15. The aromatic polycarbonate resin composition of claim 14 which further contains an elastic polymer (component D) as an impact strength modifier in an amount of 0.5 to 50 parts by weight based on 100 parts by weight of the component A.

16. The aromatic polycarbonate resin composition of claim 14 further contains an agent (component E) for suppressing the breakage of the wollastonite particles (component C) in an amount of 0.02 to 5 parts by weight based on 100 parts by weight of the component A.

17. An aromatic polycarbonate resin composition comprising:
(I) 100 parts by weight of a resin component consisting of (1) 50 to 95 wt % of an aromatic polycarbonate resin (component A) and (2) 5 to 50 wt % of a thermoplastic polyester resin (component B-1); and
(II) 1 to 100 parts by weight of wollastonite particles (component C) having such particle shape characteristics that the particles have a number average fiber length of 10 μm or less and a number average fiber diameter of 4 μm or less and include particles having a fiber length of 5 to 25 μm in a number proportion of less than 50% of the total and having a fiber length of more than 25 μm in a number proportion of 5% or less of the total, and include particles passing through a 325-mesh sieve by a wet screening method in an amount of 99.6 wt % or more.

18. The aromatic polycarbonate resin composition of claim 17 further contains an elastic polymer (component D) as an impact strength modifier in an amount of 0.5 to 50 parts by weight based on 100 parts by weight of the total of the components A and B-1.

19. The aromatic polycarbonate resin composition of claim 17 which further contains an agent (component E) for suppressing the breakage of the wollastonite particles (component C) in an amount of 9.02 to 5 parts by weight based on 100 parts by weight of the total of the components A and B-1.

20. An aromatic polycarbonate resin composition comprising:
(I) 100 parts by weight of a resin component consisting of (1) 50 to 95 wt % of an aromatic polycarbonate resin (component A) and (2) 5 to 50 wt % of a styrene unit component-containing resin having a rubber component content of less than 40 wt % (component B-2); and
(II) 1 to 100 parts by weight of wollastonite particles (component C) having such particle shape characteristics that the particles have a number average fiber length of 10 μm or less and a number average fiber diameter of 4 μm or less and include particles having a fiber length of 5 to 25 μm in a number proportion of less than 50% of the total and having a fiber length of more than 25 μm in a number proportion of 5% or less of the total, and include particles passing through a 325-mesh sieve by a wet screening method in an amount of 99.6 wt % or more.

21. The aromatic polycarbonate resin composition of claim 20 which further contains an elastic polymer (component D) as an impact strength modifier in an amount of 0.5 to 50 parts by weight based on 100 parts by weight of the total of the components A and B-2.

22. The aromatic polycarbonate resin composition of claim 20 further contains an agent (component E) for suppressing the breakage of the wollastonite particles (component C) in an amount of 0.02 to 5 parts by weight based on 100 parts by weight of the total of the components A and B-2.

23. The aromatic polycarbonate resin composition of claim 20 which further contains a flame retardant (component G) in an amount of 0.1 to 20 parts by weight based on 100 parts by weight of the total of the components A and B-2.

24. Moldings formed from the aromatic polycarbonate resin composition of any one of claims 1, 14, 17 and 20.

25. The moldings of claim 24 which have a recyclability of at least 85%.

* * * * *